US012795723B2

(12) United States Patent
Park et al.

(10) Patent No.: US 12,795,723 B2
(45) Date of Patent: Nov. 10, 2026

(54) METHOD AND DEVICE FOR PERFORMING BACKOFF AND CHANNEL ACCESS ON ANTENNA PORTS DISTRIBUTED IN DAS IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR); Insun Jang, Seoul (KR); Insik Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 255 days.

(21) Appl. No.: 18/839,659

(22) PCT Filed: Feb. 24, 2023

(86) PCT No.: PCT/KR2023/002659
§ 371 (c)(1),
(2) Date: Aug. 19, 2024

(87) PCT Pub. No.: WO2023/167471
PCT Pub. Date: Sep. 7, 2023

(65) Prior Publication Data
US 2025/0168876 A1 May 22, 2025

(30) Foreign Application Priority Data
Mar. 4, 2022 (KR) ........................ 10-2022-0028285

(51) Int. Cl.
*H04W 74/0808* (2024.01)
*H04W 84/12* (2009.01)

(52) U.S. Cl.
CPC ........ *H04W 74/0808* (2013.01); *H04W 84/12* (2013.01)

(58) Field of Classification Search
CPC ............. H04W 74/0808; H04W 84/12; H04W 74/002; H04W 74/0816; H04W 88/08; H04W 74/08; H04W 24/08
See application file for complete search history.

(56) References Cited

U.S. PATENT DOCUMENTS

2009/0042555 A1* 2/2009 Zhu ......................... H04W 8/30 455/422.1
2017/0295595 A1* 10/2017 Yang ................. H04W 74/0816
(Continued)

FOREIGN PATENT DOCUMENTS

EP 3920590 A1 12/2021
KR 10-2021-0098541 A 8/2021
WO 2020032430 A1 2/2020

*Primary Examiner* — Ivan O Latorre
(74) *Attorney, Agent, or Firm* — BRYAN CAVE LEIGHTON PAISNER LLP

(57) ABSTRACT

Proposed are a method and device for performing backoff and channel access on antenna ports distributed in a DAS in a wireless LAN system. Specifically, a reception STA checks whether one or more of a plurality of antenna ports are idle. When one or more of the antenna ports are idle, the reception STA performs backoff on the one or more antenna ports. When a counter of the backoff becomes 0, the reception STA performs channel access on a first channel that is commonly idle in the one or more antenna ports. The reception STA receives a PPDU from a transmission STA through the first channel.

15 Claims, 30 Drawing Sheets

(56) References Cited

U.S. PATENT DOCUMENTS

| | | | | |
|---|---|---|---|---|
| 2017/0302510 | A1* | 10/2017 | Yang | H01Q 1/243 |
| 2017/0303314 | A1* | 10/2017 | Cariou | H04W 74/0808 |
| 2019/0007979 | A1* | 1/2019 | Yang | H04B 7/0413 |
| 2019/0373569 | A1 | 12/2019 | Ram et al. | |
| 2021/0045135 | A1 | 2/2021 | Zhou et al. | |
| 2021/0160034 | A1 | 5/2021 | Seok | |
| 2022/0116994 | A1* | 4/2022 | Chen | H04B 7/043 |
| 2024/0187867 | A1* | 6/2024 | Liu | H04W 74/0808 |
| 2025/0168876 | A1* | 5/2025 | Park | H04W 74/0808 |

* cited by examiner (a)

(b)

(a) A Co-located Antenna system(CAS)

(b) A Distributed Antenna system(DAS)

METHOD AND DEVICE FOR PERFORMING BACKOFF AND CHANNEL ACCESS ON ANTENNA PORTS DISTRIBUTED IN DAS IN WIRELESS LAN SYSTEM

CROSS-REFERENCE TO RELATED APPLICATIONS

This application is the National Stage filing under 35 U.S.C. 371 of International Application No. PCT/KR2023/002659, filed on Feb. 24, 2023, which claims the benefit of KR Patent Application No. 10-2022-0028285 filed on Mar. 4, 2022, the contents of which are all hereby incorporated by reference herein in their entirety.

TECHNICAL FIELD

The present specification relates to a technique for performing backoff and channel access for antenna ports distributed in a DAS in a wireless LAN system, and more particularly, to a method and apparatus for configuring and transmitting and receiving PPDUs by performing channel access through a Primary_BSS channel of at least one antenna port configured in the DAS.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for performing backoff and channel access for antenna ports distributed in a DAS in a wireless LAN system.

An example of the present specification proposes a method for performing backoff and channel access for antenna ports distributed in a DAS.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment is performed at a receiving STA, and the receiving STA may correspond to a station (STA) or an access point (AP). Conversely, the transmitting STA may correspond to an AP or STA. When the transmitting STA is an AP and the receiving STA is an STA, a PPDU described later may be a downlink PPDU. When the transmitting STA is an STA and the receiving STA is an AP, a PPDU described later may be an uplink PPDU.

This embodiment proposes a method of transmitting and receiving PPDUs by performing backoff and channel access for antenna ports distributed in a DAS.

A receiving station (STA) checks whether at least one antenna port among a plurality of antenna ports is idle.

The receiving STA performs backoff for the at least one antenna port based on the at least one antenna port being idle.

The receiving STA performs channel access for a first channel that is commonly idle in the at least one antenna port based on a counter of the backoff becoming 0.

The receiving STA receives a Physical Protocol Data Unit (PPDU) from a transmitting STA through the first channel.

The transmitting STA operates in a system in which the plurality of antenna ports are distributed.

A first primary 20 MHz channel is set for the plurality of antenna ports. Additionally, a second primary 20 MHz channel may be further set for the plurality of antenna ports.

The first primary 20 MHz channel is a primary 20 MHz channel that exists within one Basic Service Set (BSS). The one BSS may be a BSS of the transmitting STA. The second primary 20 MHz channel is an additional primary 20 MHz channel for each of the plurality of antenna ports. The plurality of antenna ports may include first to fourth antenna ports.

Whether the at least one antenna port is idle is determined by/based on whether the first primary 20 MHz channel of the at least one antenna port is idle. In particular, the backoff may be performed after Arbitration Inter Frame Space (AIFS) when the first primary 20 MHz channel of the at least one antenna port is continuously confirmed to be idle.

For example, if the third and fourth antenna ports are busy, but the first and second antenna ports are idle and at least one of the two antenna ports is continuously maintained in an idle state, the transmitting STA may perform the backoff after AIFS.

That is, the present embodiment proposes a method for performing backoff and channel access on all antenna ports based on the first primary 20 MHz channel (Primary_BSS) of the distributed antenna ports.

Previously, there was no definition of the DAS transmission technique, so there was a limit to improving performance such as throughput and latency by extending the transmission distance. However, according to the embodiment proposed in this specification, by further defining an additional primary 20 MHz channel for each antenna port in addition to the existing primary 20 MHz channel in one BSS, DAS can be efficiently supported, and backoff and channel access for distributed antenna ports can be effectively performed. This has the effect of improving throughput and latency performance by extending the transmission distance.

DETAILED DESCRIPTION

Figure 1:
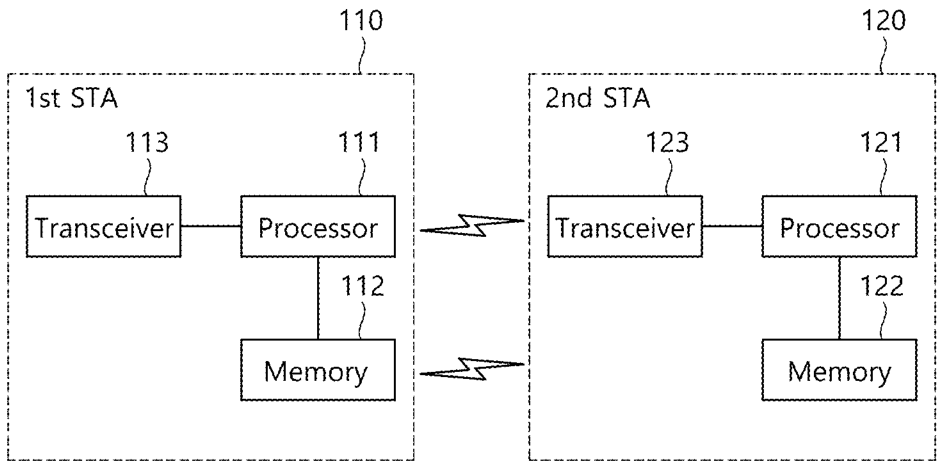
FIG. 1 shows an example of a transmitting apparatus and/or receiving apparatus of the present specification.
Figure 1:
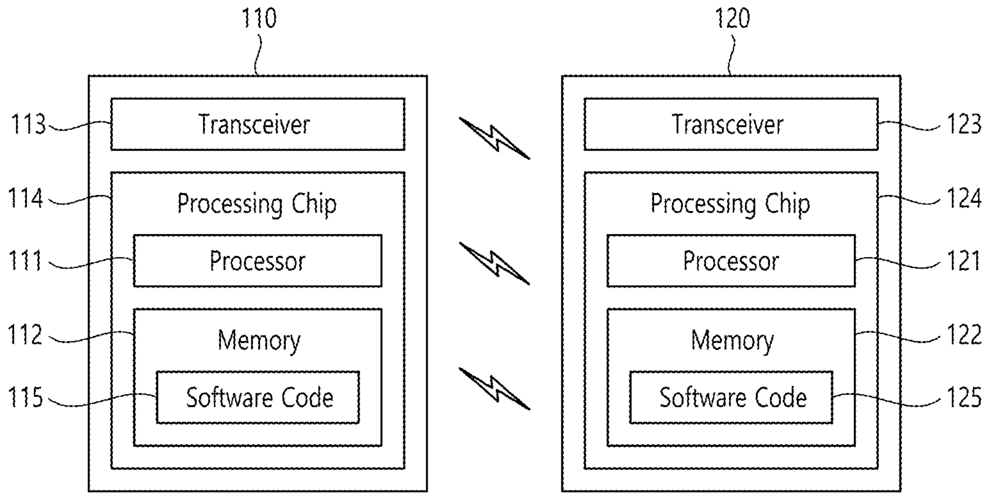

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
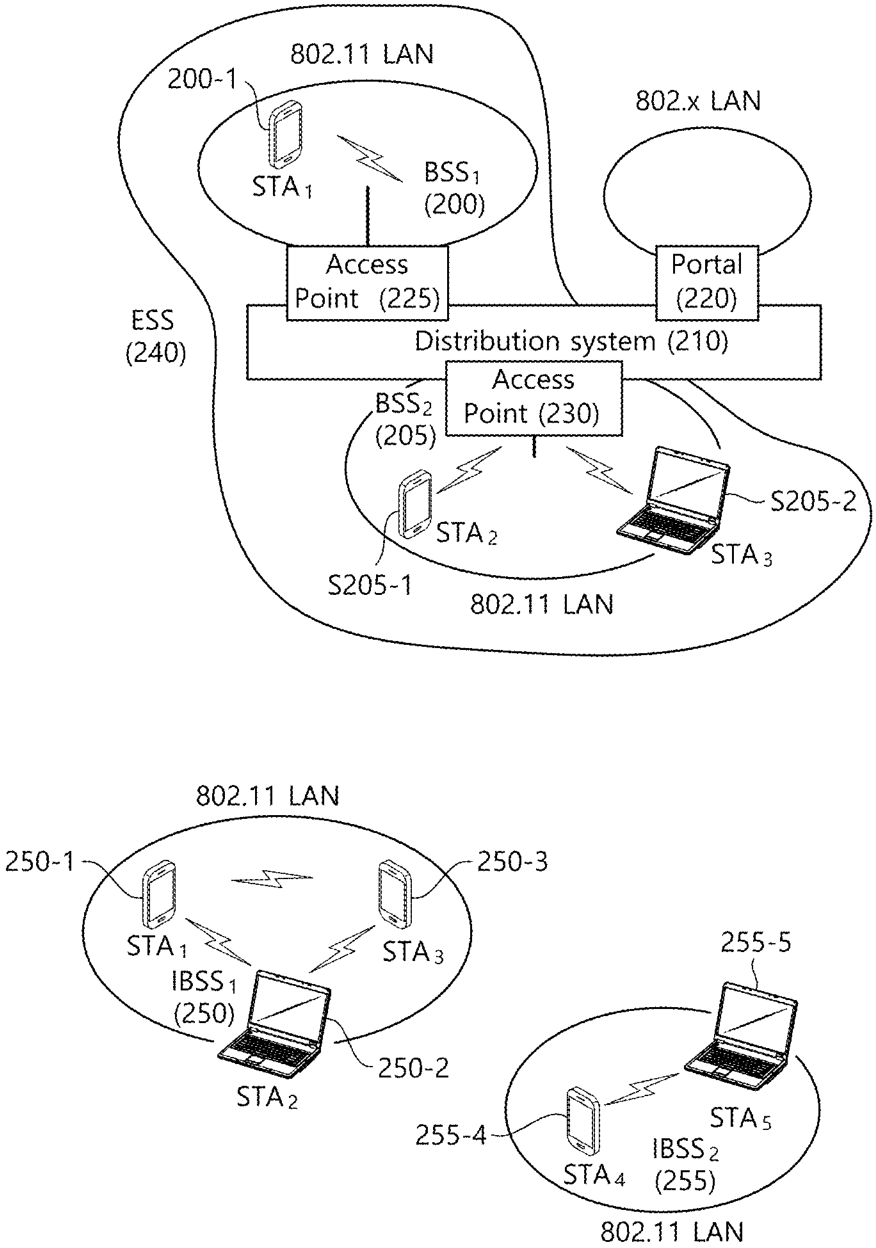
FIG. 2 is a conceptual view illustrating the structure of a wireless local area network (WLAN).

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
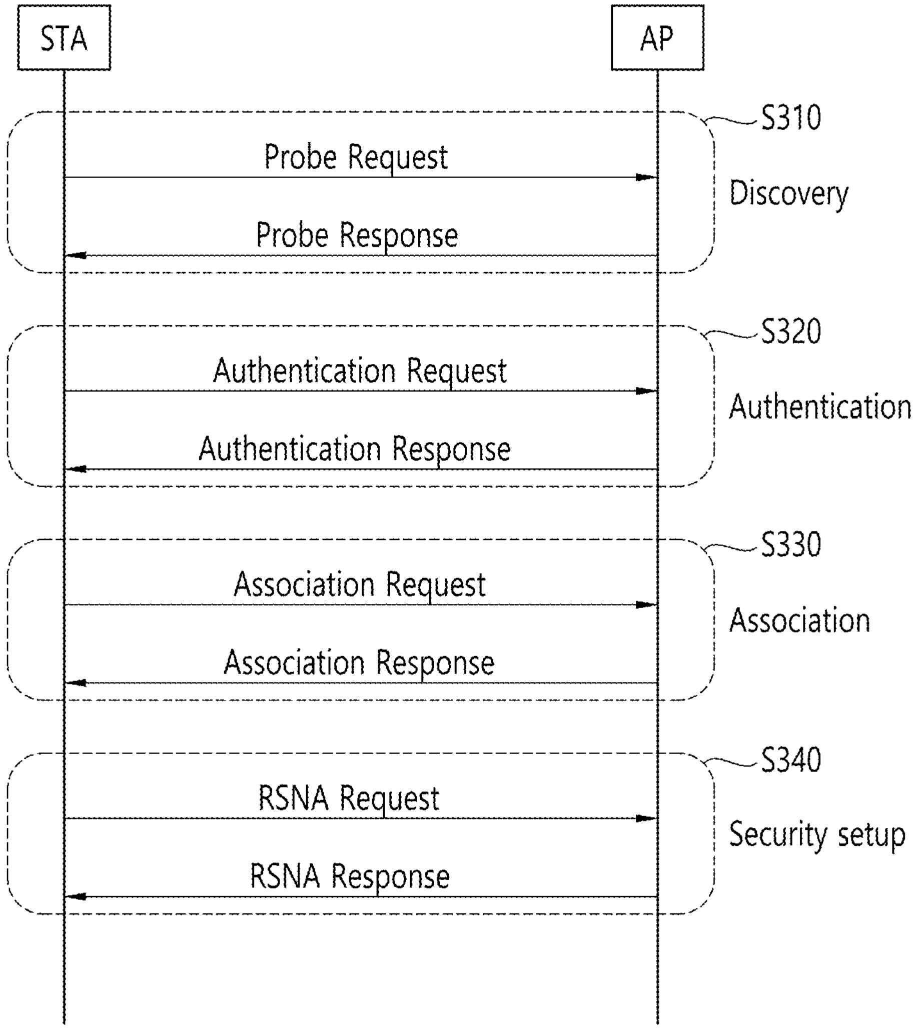
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the ISS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
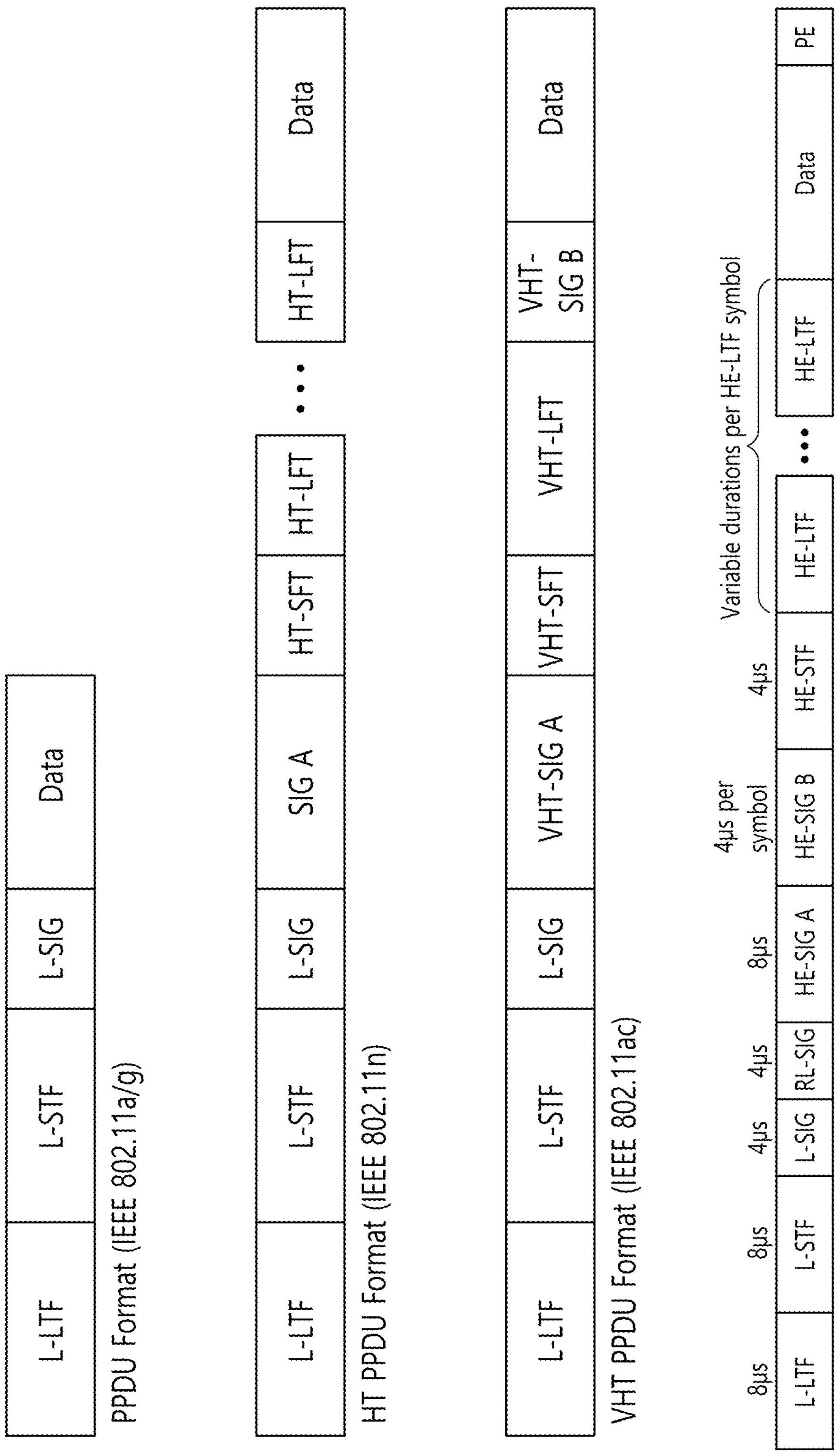
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
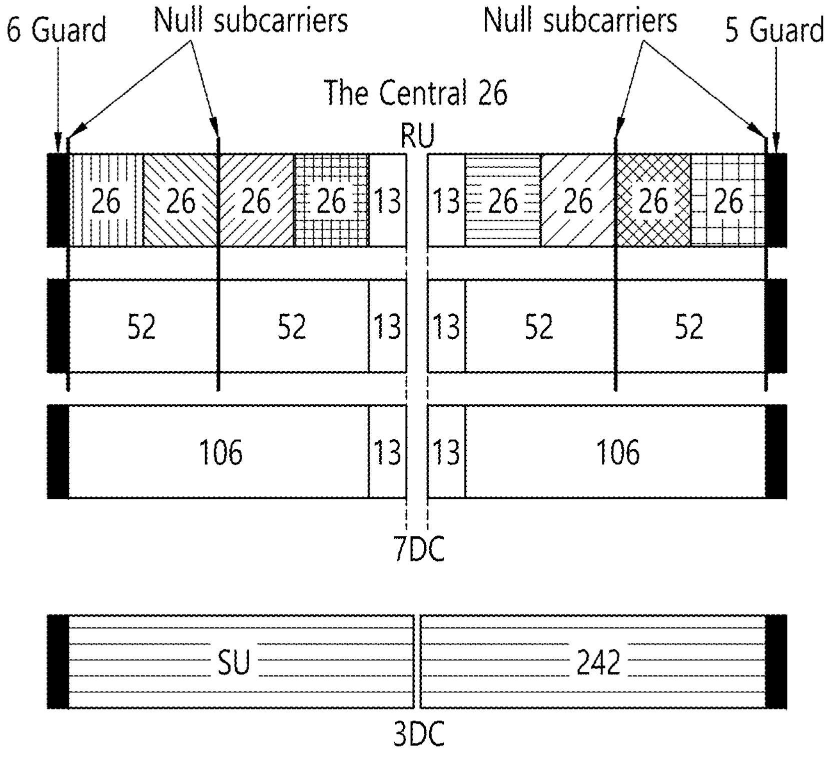
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
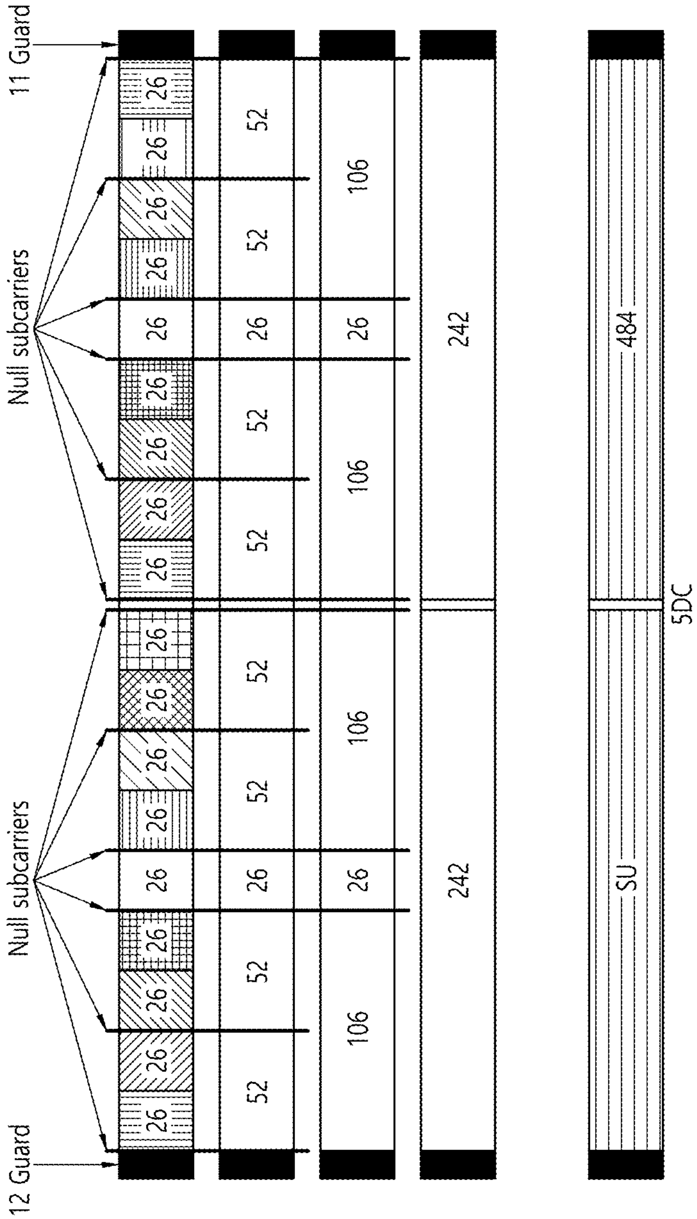
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
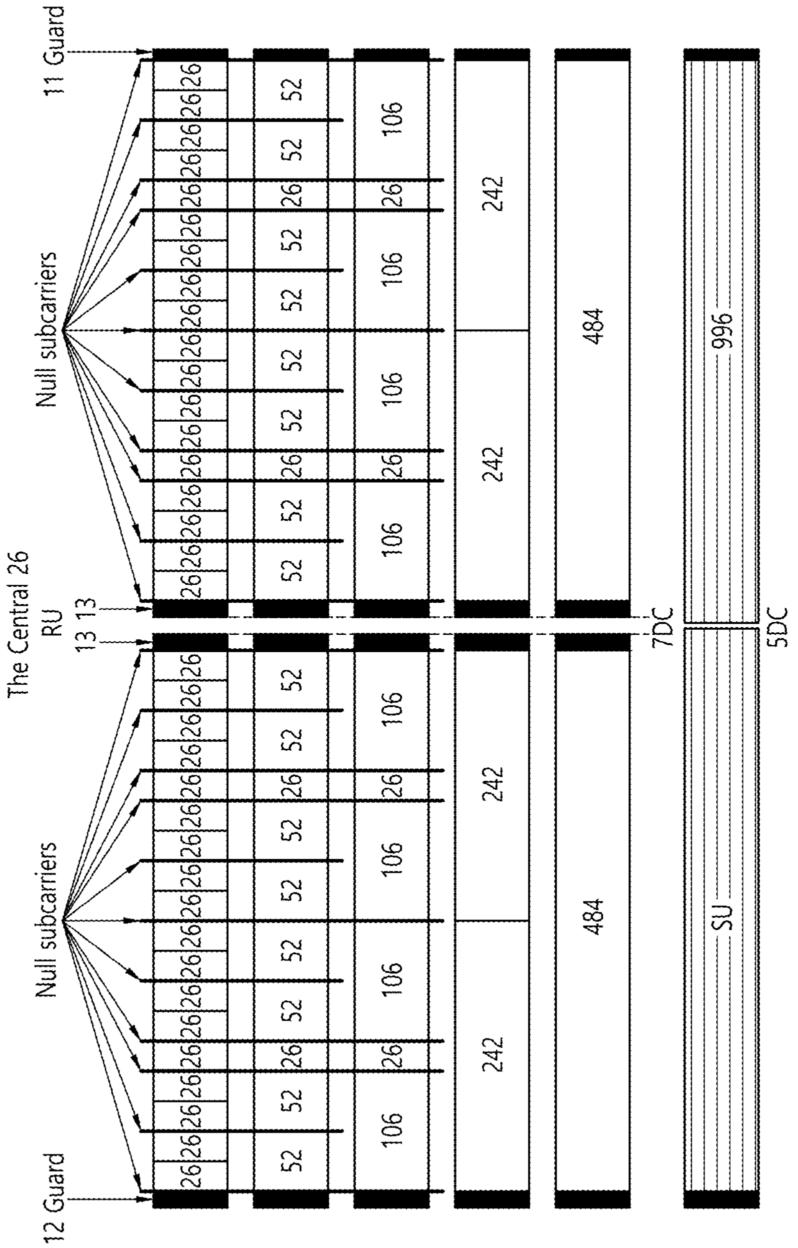
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
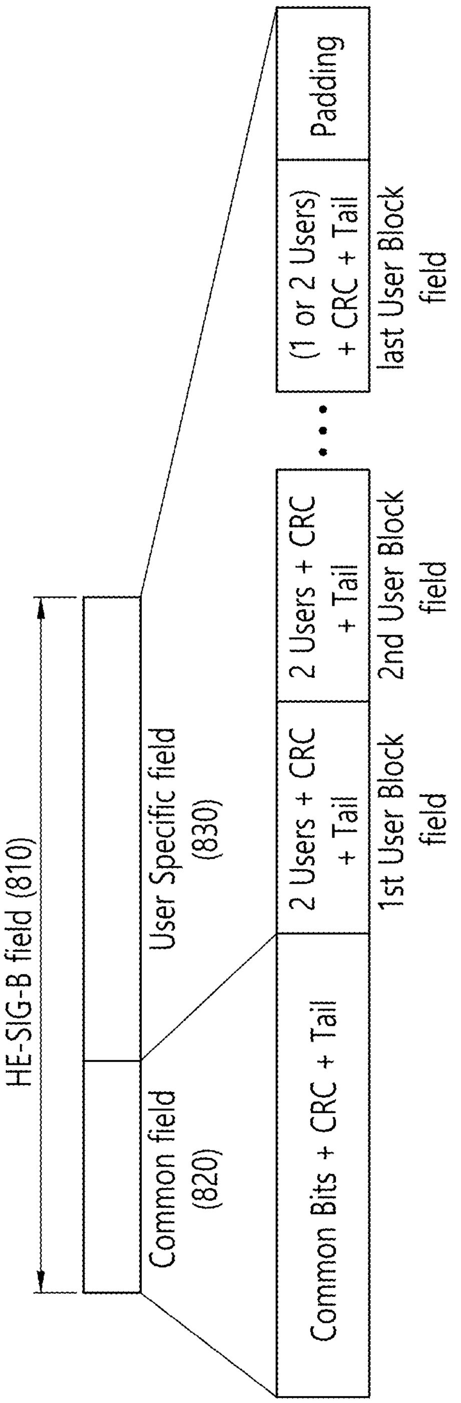
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As shown the example of FIG. 5, up to nine 26-RUs may be allocated to the 20 MHZ channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bit indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000y2y1y0 | 106 | | | | 26 | 26 | 26 | 26 | 26 | 8 |
| 01001y2y1y0 | 106 | | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
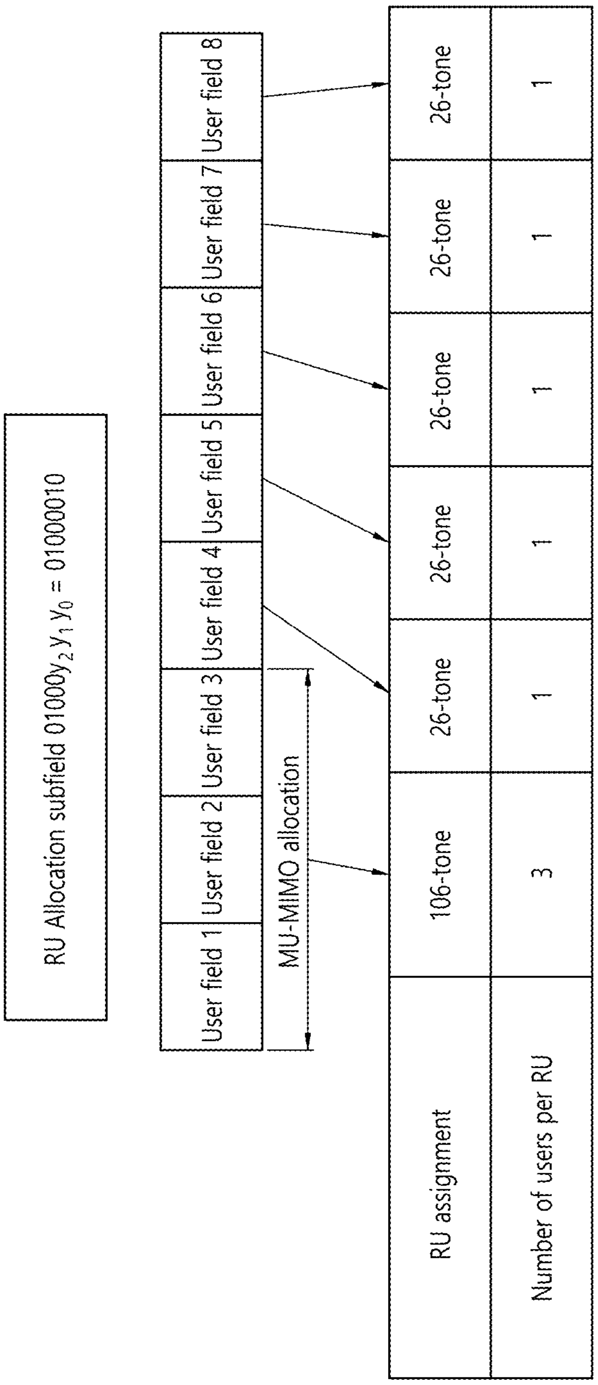
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
FIG. 10 illustrates an example of a PPDU used in the present specification.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHZ, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. The EHT-STF of FIG. 10 may be used for improving automatic gain control estimation in a multiple input multiple output (MIMO) environment or an OFDMA environment. The EHT-LTF of FIG. 10 may be used for estimating a channel in the MIMO environment or the OFDMA environment.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHZ, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHZ EHT PPDU allocated based on OFDMA may have 23 DC tones. Unlike this, an 80 MHZ EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
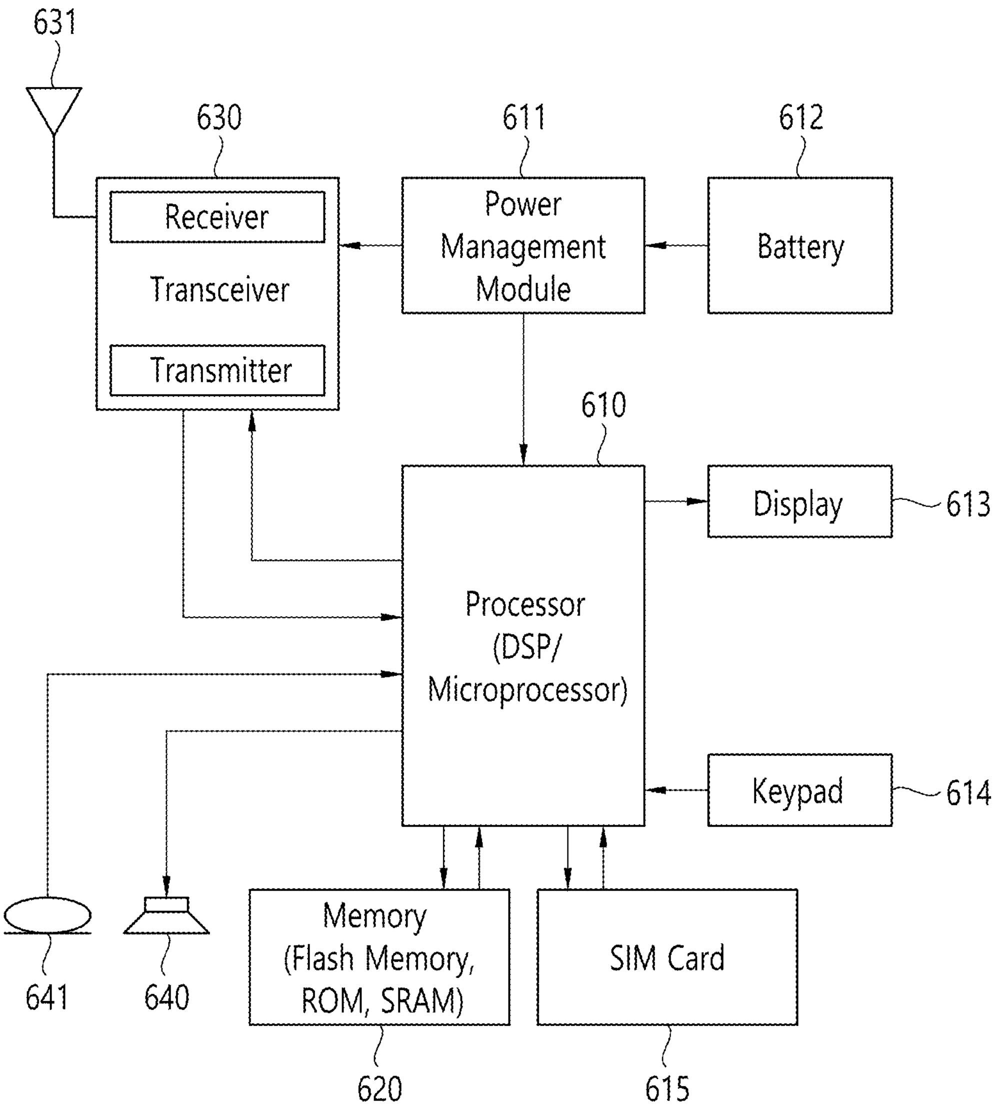
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

1. Channelization of a 6 GHz Band (Definition of a 480 MHz Channel and a 640 MHz Channels)

Figure 12:
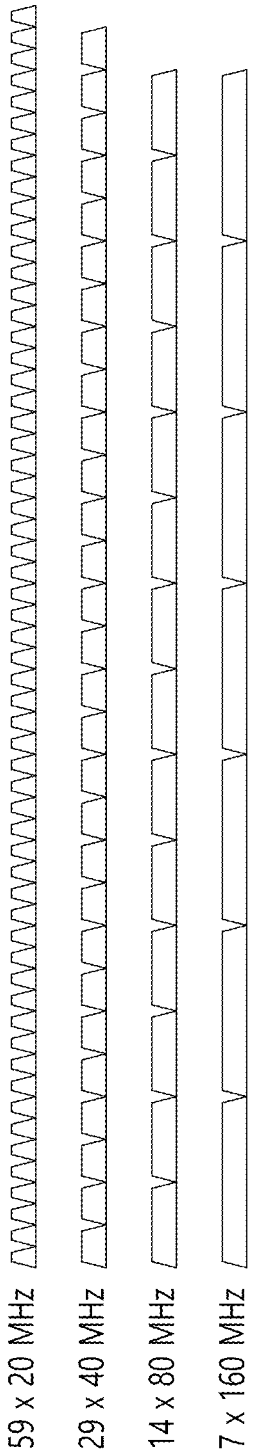
FIG. 12 shows the channelization of the 6 GHz band.
Figure 13:
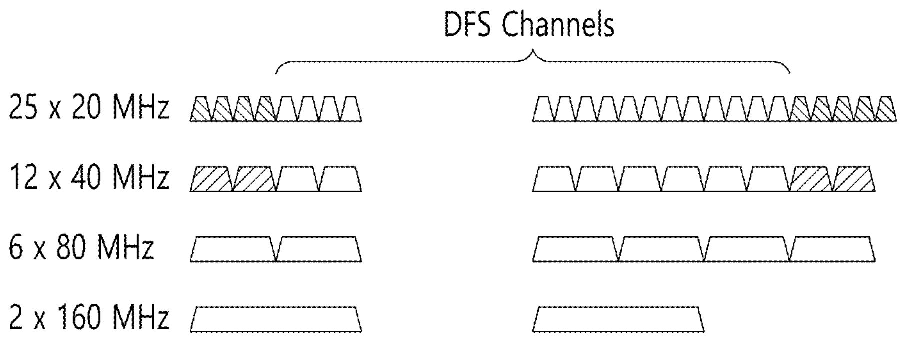
FIG. 13 shows the channelization of the 5 GHz band.
Figure 14:
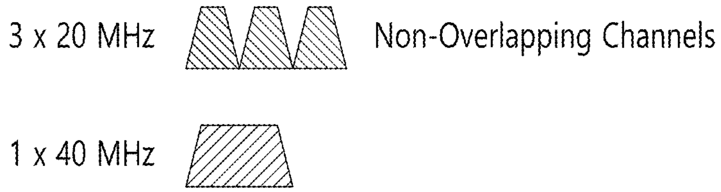
FIG. 14 shows the channelization of the 2.4 GHz band.

FIGS. 12 to 14 show channels from 20 MHz to 160 MHz currently used in 802.11be.

FIG. 12 shows the channelization of the 6 GHz band.

Referring to FIG. 12, the 6 GHz band has a total spectrum of 1200 MHz, and the total spectrum may include 59 20 MHz channels, 29 40 MHz channels, 14 80 MHz channels, or 7 160 MHz channels.

FIG. 13 shows the channelization of the 5 GHz band.

Referring to FIG. 13, the 5 GHz band has a total spectrum of 500 MHZ (180 MHZ without DFS (Dynamic Frequency Selection)), and the total spectrum may include 25 20 MHz channels, 12 40 MHz channels, 6 80 MHz channels, or 2 160 MHz channels.

FIG. 14 shows the channelization of the 2.4 GHz band.

Referring to FIG. 14, the 2.4 GHz band has a total spectrum of 80 MHz, and the total spectrum may include three 20 MHz channels (non-overlapping channels) or one 40 MHz channel.

Figure 15:
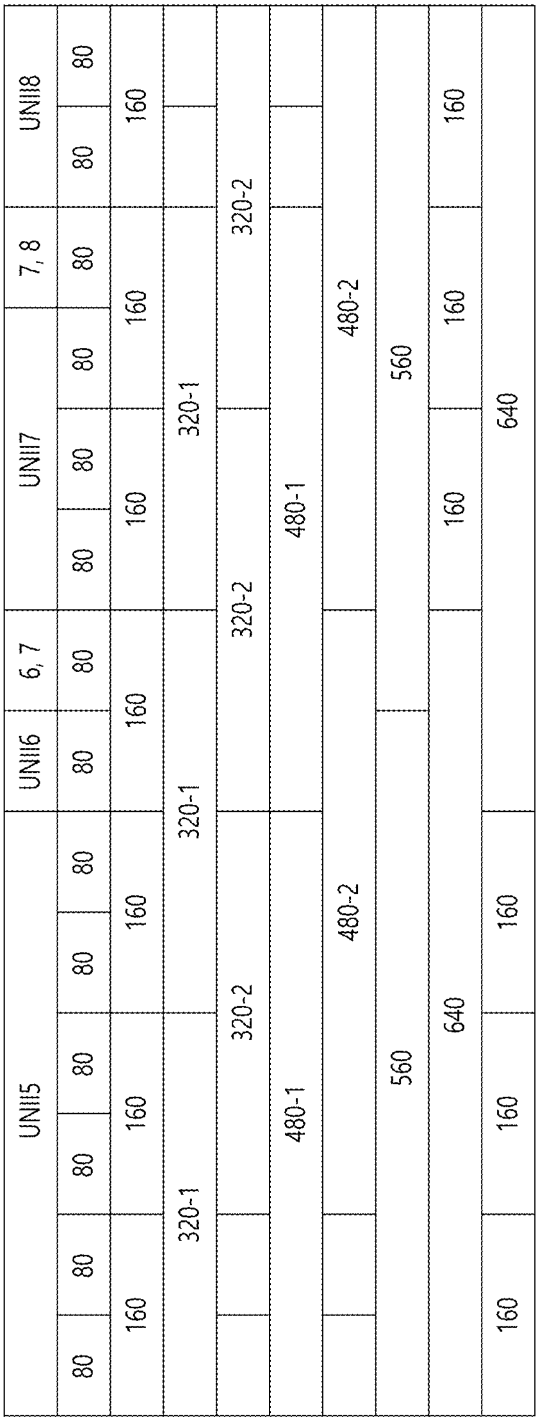
FIG. 15 shows channelization and extended channelization of the 6 GHz band of the 802.11be wireless LAN system.

FIG. 15 shows channelization and extended channelization of the 6 GHz band of the 802.11be wireless LAN system.

Referring to FIG. 15, a 320 MHz channel is generated by combining two 160 MHz channels, and two types of 320 MHz channels (320-1 MHz channel and 320-2 MHz channel) overlap each other. In other words, a 320 MHz channel was defined to maximize utilization within the total spectrum of the 6 GHz band by partially overlapping 320 channels.

EHT (802.11be) supports not only the 160 MHz BW (BandWidth) that was supported up to 802.11ax, but also a wider BW (BandWidth) of 320 MHz. In the existing 20/40/80/160 MHz channelization, overlapping channels did not exist. However, 320 MHz BW includes overlapping channels such as 320-1 MHz and 320-2 MHz in FIG. 15. Overlapping channels may or may not exist between the 320-1 MHz channel and the 320-2 MHz channel. for example, in FIG. 15, the first 320-1 MHz channel and the first 320-2 MHz channel have overlapping channels of 160 MHz BW, but the first 320-1 MHz channel and the second 320-2 MHz channel do not have overlapping channels. Meanwhile, currently, the 320-1 MHz channel and the 320-2 MHz channel are signaled separately in the BW subfield of the Universal Signal (U-SIG) field of the EHT PPDU. The 320-1 MHz channel and 320-2 MHz channel are channels supported by different BSS (Basic Service Set). For example, the first BSS may support a 320-1 MHz channel, and the second BSS may support a 320-2 MHz channel.

The reason for distinguishing between 320-1 MHz and 320-2 MHz is because if the STA's primary 20 MHz channel is in an area where 320-1 MHz and 320-2 MHz overlap, it must be distinguished whether it is allocated to 320-1 MHz or 320-2 MHz.

In this specification, the 160 MHz channel including the primary channel (i.e., 20 MHz primary channel) is referred to as P160, and the 160 MHz channel without it is referred to as S160.

Additionally, this specification proposes to include a 480 MHz channel and a 640 MHz channel, which are extended channels within the 6 GHz band. Descriptions of the 480 MHz channel and 640 MHz channel will be provided later.

The table below shows the configuration of the U-SIG Version Independent field in the EHT MU PPDU of FIG. 10. The Version Independent field can be used in the format below even in Wi-Fi after 802.11be.

TABLE 3

| Two parts of U-SIG | Bit | Field | Number of bits | Description |
|---|---|---|---|---|
| U-SIG-1 | B0-B2 | PHY Version Identifier | 3 | Differentiate between different PHY clauses.<br>Set to 0 for EHT.<br>Values 1-7 are Validate. |
| | B3-B5 | Bandwidth | 3 | Set to 0 for 20 MHz.<br>Set to 1 for 40 MHz.<br>Set to 2 for 80 MHz.<br>Set to 3 for 160 MHz.<br>Set to 4 for 320 MHZ-1.<br>Set to 5 for 320 MHZ-2.<br>Values 6 and 7 are Validate. |
| | B6 | UL/DL | 1 | Indicates whether the PPDU is sent in UL or DL. Set to the TXVECTOR parameter UPLINK_FLAG.<br>A value of 1 indicates the PPDU is addressed to an AP.<br>A value of 0 indicates the PPDU is addressed to a non-AP STA. |
| | B7-B12 | BSS Color | 6 | An identifier of the BSS.<br>Set to the TXVECTOR parameter BSS_COLOR. |
| | B13-B19 | TXOP | 7 | If the TXVECTOR parameter TXOP_DURATION is UNSPECIFIED, set to 127 to indicate the absence of duration information.<br>If the TXVECTOR parameter TXOP_DURATION is an integer value, set to a value less than 127 to indicate duration information for NAV setting and protection of the TXOP as follows:<br>If the TXVECTOR parameter TXOP_ DURATION is less than 512, set to 2 × floor(TXOP_DURATION/8).<br>Otherwise, set to 2 × floor((TXOP_DURATION − 512)/128) + 1. |
| | B20-B24 | Disregard | 5 | Set to all 1s and treat as Disregard. |
| | B25 | Validate | 1 | Set to 1 and treat as Validate. |
| U-SIG-2 | B0-B1 | PPDU Type And Compression Mode | 2 | If the UL/DL field is set to 0:<br>A value of 0 indicates a DL OFDMA transmission. |

TABLE 3-continued

| Two parts of U-SIG | Bit | Field | Number of bits | Description |
|---|---|---|---|---|
| | | | | A value of 1 indicates a transmission to a single user or an EHT sounding NDP. A value of 2 indicates a non-OFDMA DL MU-MIMO transmission. A value of 3 is Validate. If the UL/DL field is set to 1: A value of 1 indicates a transmission to a single user or an EHT sounding NDP. Values 2 and 3 are Validate. NOTE-A value of 0 indicates a TB PPDU. For further clarifications on all values of this field, refer to Table 9 (Combination of UL/DL and PPDU Type And Compression Mode field). |
| | B2 | Validate | 1 | Set to 1 and treat as Validate. |
| | B3-B7 | Punctured Channel Information | 5 | If the PPDU Type And Compression Mode field is set to 1 regardless of the value of the UL/DL field, or the PPDU Type And Compression Mode field is set to 2 and the UL/DL field is 0: Indicates the puncturing information of this non-OFDMA transmission. See Table 10 (Definition of the Punctured Channel Information field in the U-SIG for an EHT MU PPDU using non-OFDMA transmissions) for the definition. Undefined values of this field are Validate. If the PPDU Type And Compression Mode field is set to 0 and the UL/DL field is 0: If the Bandwidth field is set to a valuc between 2 and 5, which indicates an 80 MHz, 160 MHz or 320 MHz PPDU, then B3-B6 is a 4-bit bitmap that indicates which 20 MHz subchannel is punctured in the 80 MHz frequency subblock where U-SIG processing is performed. The 4-bit bitmap is indexed by the 20 MHz subchannels in ascending order with B3 indicating the lowest frequency 20 MHz subchannel. For each of the bits B3-B6, a value of 0 indicates that the corresponding 20 MHz channel is punctured, and a value of 1 is used otherwise. The following allowed punctured patterns (B3-B6) are defined for an 80 MHz frequency subblock: 1111 (no puncturing), 0111, 1011, 1101, 1110, 0011, 1100, and 1001, Any field values other than the allowed punctured patterns are Validate. Field value may be varied from one 80 MHz to the other. If the Bandwidth field is set to 0 or 1, which indicates a 20/40 MHz PPDU, B3-B6 are set to all 1s. Other values are Validate B7 is set to 1 and Disregard. |
| | B8 | Validate | 1 | Set to 1 and treat as Validate. |
| | B9-B10 | EHT-SIG MCS | 2 | Indicates the MCS used for modulating the EHT-SIG. Set to 0 for EHT-MCS 0. Set to 1 for EHT-MCS 1. Set to 2 for EHT-MCS 3. Set to 3 for EHT-MCS 15. |
| | B11-B15 | Number Of EHT-SIG Symbols | 5 | Indicates the number of EHT-SIG symbols. Set to a value that is the number of EHT-SIG symbols minus 1. This value shall be the same in every 80 MHz frequency subblock. |
| | B16-B19 | CRC | 4 | CRC for bits 0-41 of the U-SIG field. Bits 0-41 of the U-SIG field correspond to bits 0-25 of U-SIG-1 field followed by bits 0-15 of U-SIG-2 field. |
| | B20-B25 | Tail | 6 | Used to terminate the trellis of the convolutional decoder. Set to 0. |

In Wi-Fi after 802.11be, PHY Version Identifier can be set to a value other than 0. Additionally, when a bandwidth and channel wider than 320 MHz can be defined and PPDU is transmitted using that bandwidth, it can be indicated using the Validate value (i.e., 6 and 7) of the BW field in Table 3 above, or can be indicated by using an additional 1 bit in the BW field.

2. HE/EHT Operation Element Definition

2.1 HE Operation Element

In a High Efficiency (HE) BSS, the operation of HE STAs is controlled by the following.

- High Throughput (HT) Operation element and HE Operation element when operating in the 2.4 GHz band
- HE Operation element, Very High Throughput (VHT) Operation element (if present), and HE Operation element when operating in the 5 GHz band
- HE Operation element when operating in the 6 GHz band (operation in the 6 GHz band is first defined in 802.11ax).

Figure 16:
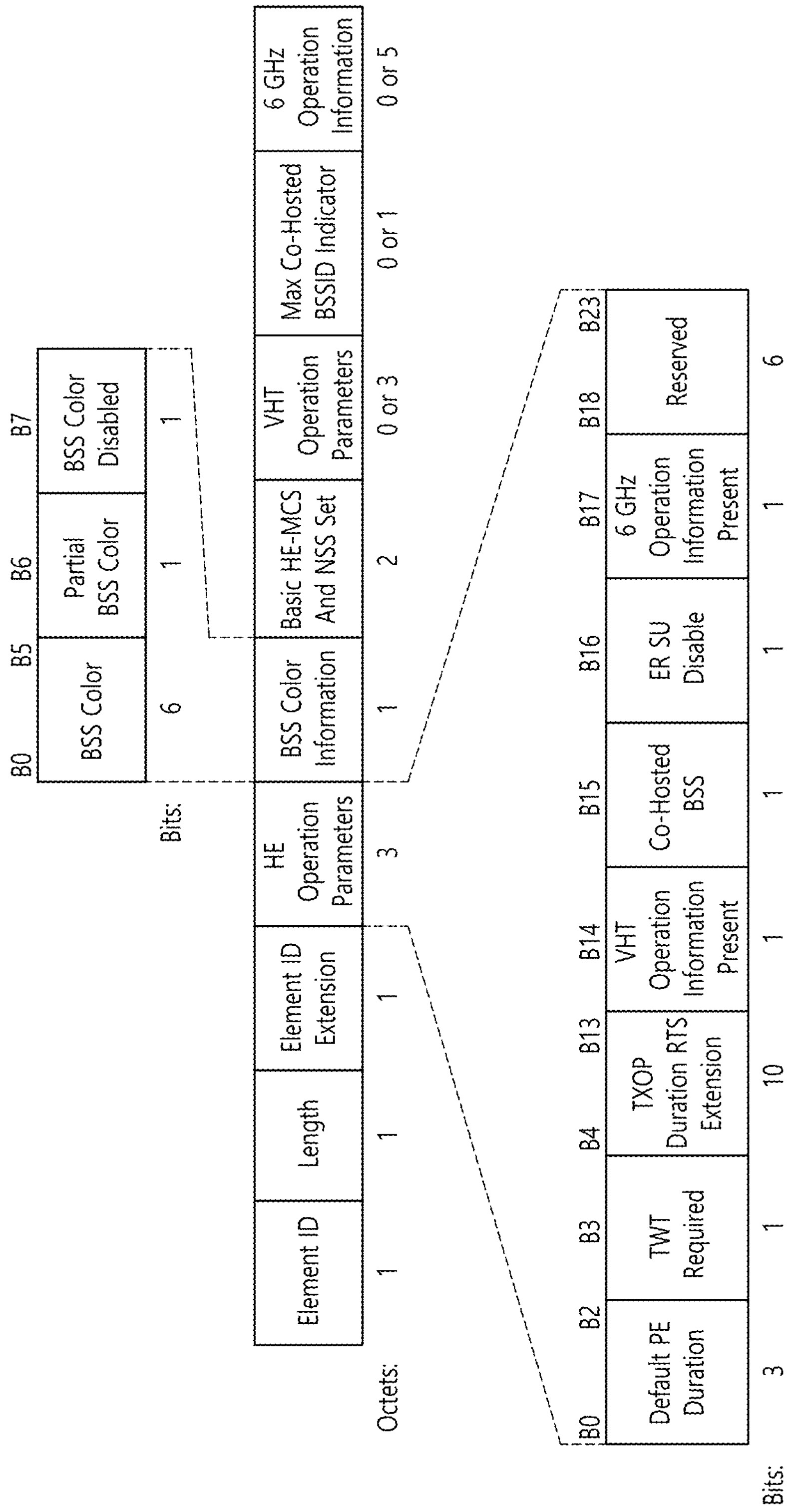
FIG. 16 shows the format of the HE Operation element.

FIG. 16 shows the format of the HE Operation element.

The HE Operation element may include a HE Operation Parameters field, a BSS Color Information field, and a 6 GHz Operation Information field, etc.

The HE Operation Parameters field includes a Default PE Duration subfield, a TWT Required subfield, a TXOP Duration RTS Threshold subfield, a VHT Operation Information Present subfield, a Co-Hosted BSS subfield, an ER SU Disable subfield, and a 6 GHz Operation Information Present subfield, etc.

The Default PE Duration subfield, along with the TRS Control subfield, indicates a Packet Extension (PE) field duration in 4 us units for the requested HE Trigger Based (TB) PPDU. Values 5-7 of the Default PE Duration subfield are reserved.

When the 6 GHz Operation Information Present subfield is set to 1, the 6 GHZ Operation Information field exists, and when the 6 GHz Operation Information Present subfield is set to 0, the 6 GHz Operation Information field does not exist. The 6 GHz Operation Information Present subfield is set to 1 by the AP operating in the 6 GHz band.

The BSS Color Information field includes a BSS Color subfield, Partial BSS Color subfield, and BSS Color Disabled subfield.

Figure 17:
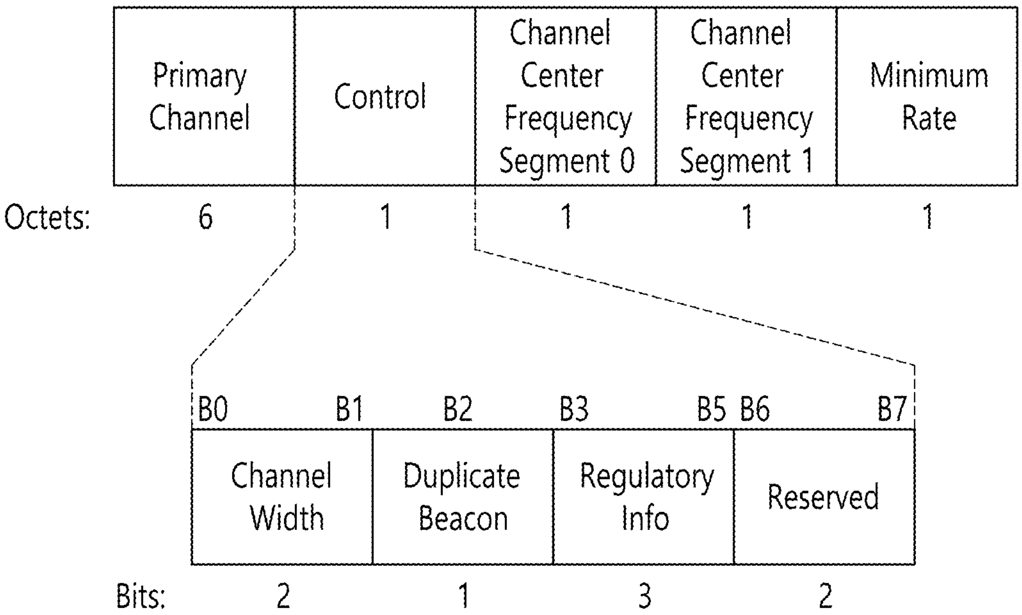
FIG. 17 shows the format of the 6 GHz Operation Information field.

FIG. 17 shows the format of the 6 GHz Operation Information field.

The 6 GHz Operation Information field includes a Primary Channel field, Control field, Channel Center Frequency Segment 0/1 field, and Minimum Rate field, etc.

The Primary Channel field indicates the number of primary channels in the 6 GHz band.

The Control field includes a Channel Width subfield, Duplicate Beacon subfield, and Regulatory Info subfield.

The Channel Width subfield indicates the BSS channel width and is set to 0 for 20 MHz, 1 for 40 MHz, 2 for 80 MHz, and 3 for 80+80 or 160 MHz.

2.2 EHT Operation Element

The operation of EHT STAs in the EHT BSS is controlled by:

- When operating in the 2.4 GHz band, HT Operation element, HE Operation element, and EHT Operation element
- When operating in the 5 GHz band, HE Operation element, VHT Operation element (if present), HE Operation element, and EHT Operation element
- HE Operation element and EHT Operation element when operating in the 6 GHz band.

Figure 18:
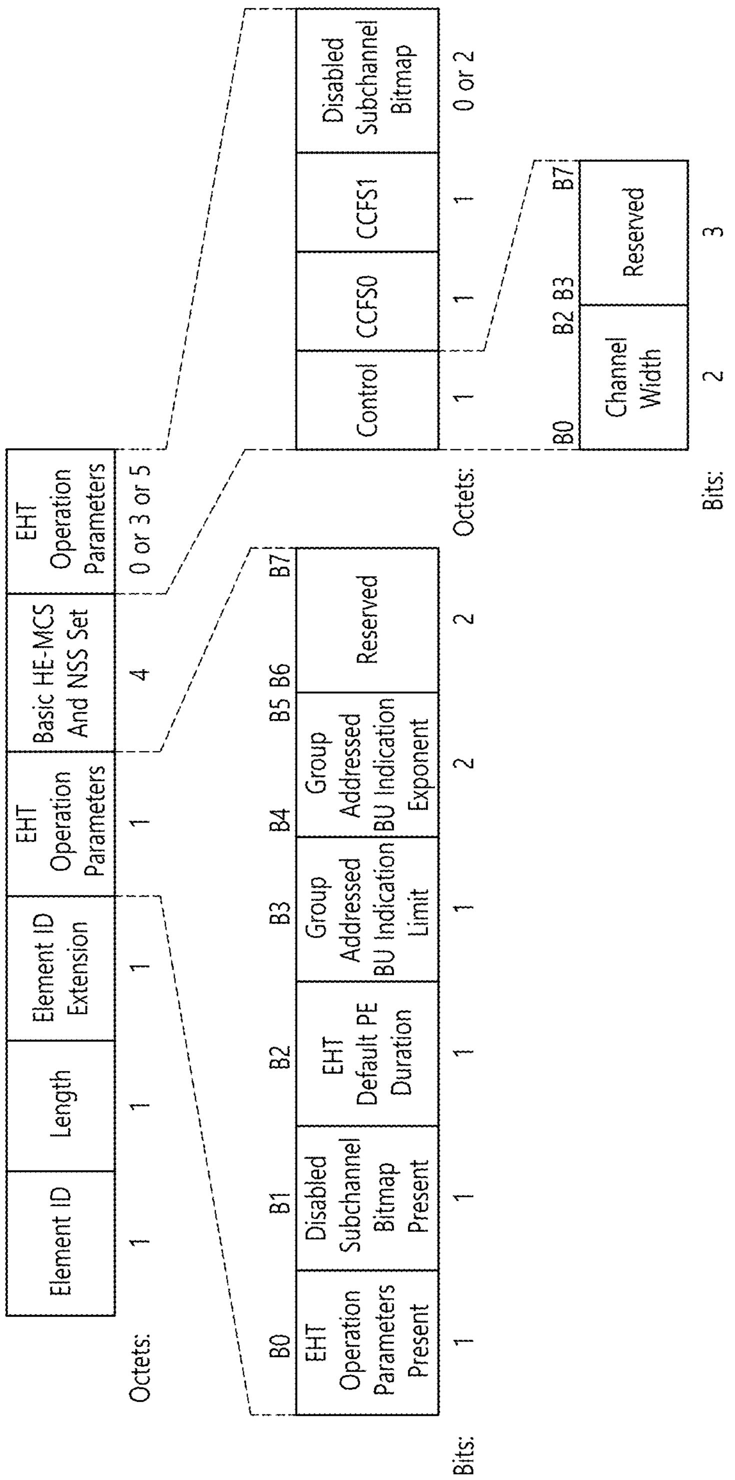
FIG. 18 shows the format of a modified EHT Operation element.

FIG. 18 shows the format of a modified EHT Operation element.

The EHT Operation element in FIG. 18 includes an EHT Operation Parameters field and an EHT Operation Information field, etc.

The EHT Operation Parameters field includes a EHT Operation Information Present subfield, Disabled Subchannel Bitmap Present subfield, EHT Default PE Duration subfield, Group Addressed BU Indication Limit subfield, and Group Addressed BU Indication Exponent subfield, etc.

When the EHT Operation Information Present subfield is 1, the EHT Operation Information field exists, and when the EHT Operation Information Present subfield is 0, the EHT Operation Information field does not exist.

If the channel width indicated in the HT Operation, VHT Operation, or HE Operation element existing in the same management frame is different from the Channel Width field indicated in the EHT Operation Information field, the EHT Operation Information Present subfield is set to 1.

If the EHT Operation Information field exists, the EHT STA obtains channel configuration information from the EHT Operation Information field in the EHT Operation element.

The EHT Operation Information field includes a Control subfield, CCFS0 subfield, CCFS1 subfield, and Disabled Subchannel Bitmap subfield. The Control subfield includes a Channel Width subfield.

The Channel Width subfield, the CCFS0 subfield, and the CCFS1 subfield are defined as follows.

| Subfield | Definition | Encoding |
|---|---|---|
| Channel Width | This subfield defines the EHT BSS bandwidth. | Set to 0 for 20 M EHT BSS bandwidth. Set to 1 for 40 M EHT BSS bandwidth. Set to 2 for 80 M EHT BSS bandwidth. Set to 3 for 160 M EHT BSS bandwidth. Sct to 4 for 320 M EHT BSS bandwidth. Values in the ranges 5 to 7 are reserved. |
| CCFS0 | This subfield defines a channel center frequency for a 20, 40, 80, 160, or | For 20, 40 or 80M BSS bandwidth, indicates the channel center frequency |

-continued

| Subfield | Definition | Encoding |
| --- | --- | --- |
| | 320M EHT BBS. | index for the 20, 40 or 80M channel on which the EHT BSS operates. For 160 MBSS bandwidth, indicates the channel center frequency index of the primary 80M channel. For 320M BSS bandwidth, indicates the channel center frequency index of the primary 160M channel. |
| CCFS1 | This subfield defines a channel center frequency for a 160 or 320M EHT BBS. | For a 20, 40 or 80M BSS bandwidth, this subfield is set to 0. For a 160M BSS bandwidth, indicates the channel center frequency index of the 160M channel on which the EHT BSS operates. For a 320M BSS bandwidth, indicates the channel center frequency index of the 320M channel on which the EHT BSS operates. See Table EHT BSS channel width. |

Below shows the values of the Channel Width subfield and CCFS1 subfield according to the EHT BSS channel width.

| Channel Width subfield | CCFS1 subfield | EHT BSS channel width (M) |
| --- | --- | --- |
| 0 | 0 | 20 |
| 1 | 0 | 40 |
| 2 | 0 | 80 |
| 3 | CCFS1 > 0 and \|CCFS1 − CCFS0\| = 8 | 160 |
| 4 | CCFS1 > 0 and \|CCFS1 − CCFS0\| = 16 | 320 |

3. SST (Subchannel Selective Transmission)

Figure 19:
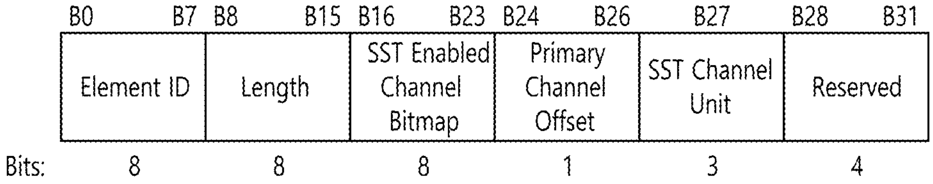
FIG. 19 shows the format of the SST Operation element.

FIG. 19 shows the format of the SST Operation element.

Referring to FIG. 19, the SST Operation element includes an Element ID field, a Length field, an SST Enabled Channel Bitmap field, a Primary Channel Offset field, and an SST Channel Unit field.

The SST Enabled Channel Bitmap field includes a bitmap indicating channels that enable SST operation. Each bit of the bitmap corresponds to one channel width equal to the value of the SST Channel Unit field, along with the Least Significant Bit (LSB) corresponding to the lowest numbered subchannel in the SST Enabled Channel Bitmap field. The channel number of each channel in the SST Enabled Channel Bitmap field is equal to PCN minus OPC plus POS. The PCN is the value of the Primary Channel Number subfield in the recently transmitted S1G Operation element, and the OPC is the value of the primary channel associated with the subchannel numbered with the lowest number in the bitmap specified by the value of the Primary Channel Number subfield. is the offset, and POS is the position of the channel in the bitmap. Setting the bit position of the bitmap to 1 indicates a subchannel that enables SST operation. At least one bit in the bitmap may be equal to 1.

The Primary Channel Offset field indicates the relative position of the primary channel with respect to/based on the channel numbered with the lowest number in the SST Enabled Channel Bitmap field. For example, setting the Primary Channel Offset field to 2 indicates that the primary channel is the third subchannel in the SST Enabled Channel Bitmap field.

The SST Channel Unit field indicates the channel width unit of each SST channel. Setting this field to 1 indicates that the channel width unit is 1 MHz, and setting this field to 0 indicates that the channel width unit is 2 MHz.

SST is defined in the 802.11ax (High Efficiency) wireless LAN system, and can be equally applied to future wireless LAN systems. Below, HE SST is described.

HE SST non-AP STA and HE SST AP can set SST operation by negotiating trigger-enabled Target Wakeup Time (TWT).

HE SST non-AP STAs and HE SST APs that have successfully configured SST operation must follow the following rules.

If the HE SST AP wants to change the operating channel or channel width, or the new operating channel or channel width does not belong to any secondary channel in the trigger-enabled TWT, the HE SST AP and HE SST non-AP STA implicitly trigger the trigger-enabled TWT can be terminated.

HE SST AP follows the rules defined in Individual TWT agreements to exchange frames with HE SST non-AP STAs during the trigger-enabled TWT.

The HE SST non-AP STA may include a Channel Switch Timing element in the (Re-)Association Request frame, and may transmit this to the HE SST AP to indicate the time requested by the STA for switching between different channels. The received channel switch time may inform the HE SST AP of the time duration during which the HE SST non-AP STA is not available to receive frames before the TWT start time and after the end of the trigger-enabled TWT SP.

In Power Saving (PS) mode, it is not required for the HE SST STA to move to the primary channel after the end of the trigger-enabled TWT SP.

4. Multi-AP System

Mesh Wi-Fi (Multi-AP solution) is well accepted in the market for better coverage, easy deployment and high throughput. It is desirable to improve the performance of Mesh Wi-Fi through joint optimization of MAC and PHY for Multi-AP systems.

Figure 20:
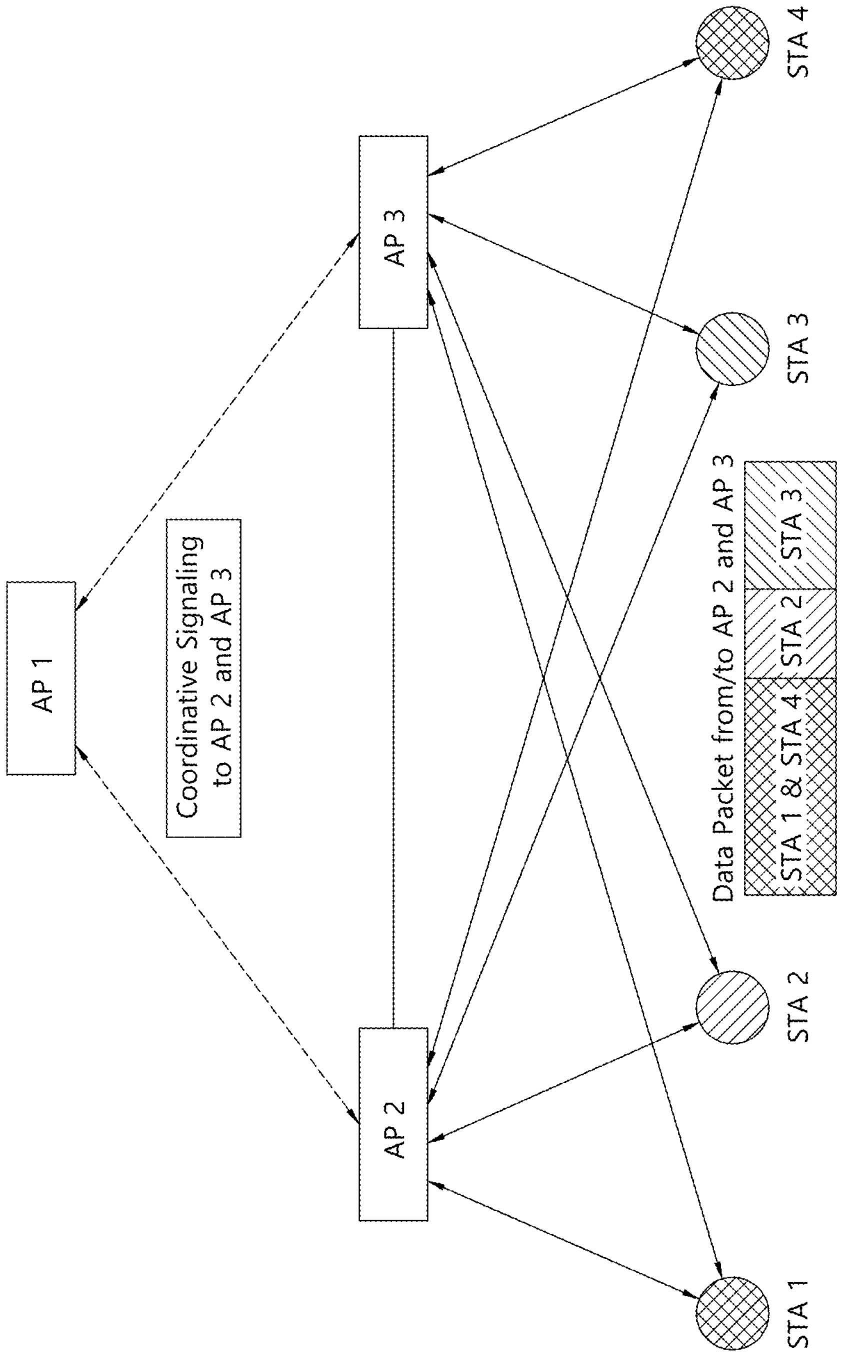
FIG. 20 shows the topology of the Multi-AP system.

FIG. 20 shows the topology of the Multi-AP system.

FIG. 20 shows activation of joint Multi-AP transmission. Referring to FIG. 20, AP 1 sends a coordination signal to AP 2 and AP 3 to start joint transmission. AP 2 and AP 3 transmit and receive data to and from multiple STAs using OFDMA and MU-MIMO within one data packet. STA 2 and STA 3 are in different RUs, and each RU is a frequency segment. STA 1 and STA 4 are in the same resource unit using MU-MIMO. Each RU may be transmitted in multiple spatial streams.

Figure 21:
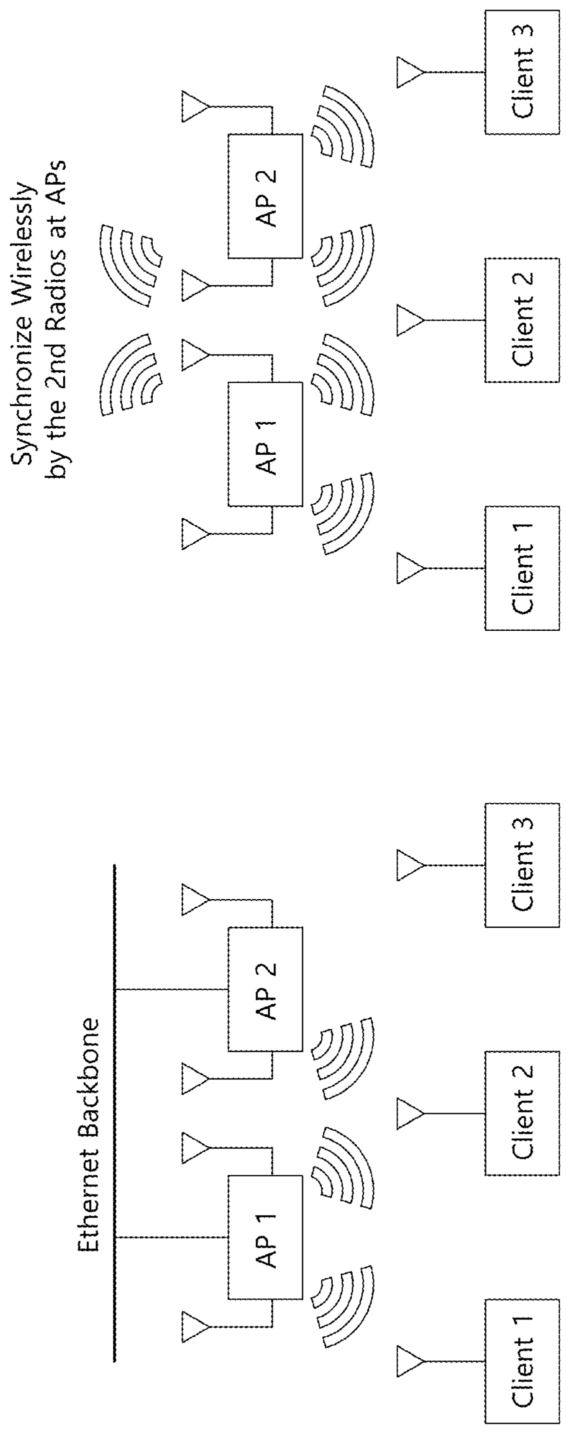
FIG. 21 is a diagram of coordination of Multi-AP.

FIG. 21 is a diagram of coordination of Multi-AP.

Referring to FIG. 21, the Multi-AP system utilizes a wired (e.g. enterprise) or wireless (e.g. home mesh) backbone for data+clock synchronization, and limits link budget and regulated power better than a single AP with a large antenna array. Example technologies include Null Steering, joint beamforming, and joint MU-MIMO for interference avoidance.

Figure 22:
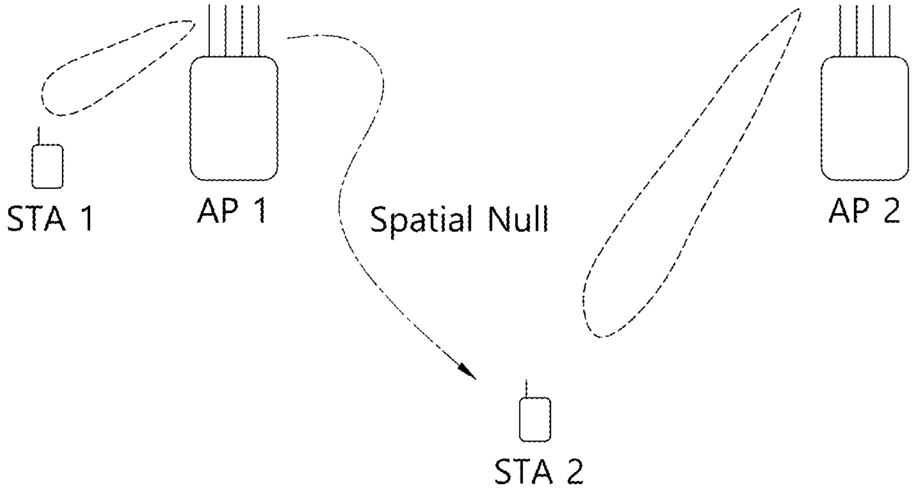
FIG. 22 shows interference avoidance steering of Multi-AP.

FIG. 22 shows interference avoidance steering of Multi-AP.

The interference avoidance steering of FIG. 22 is useful when the APs are of large dimensions (4×4 or 8×8).

Figure 23:
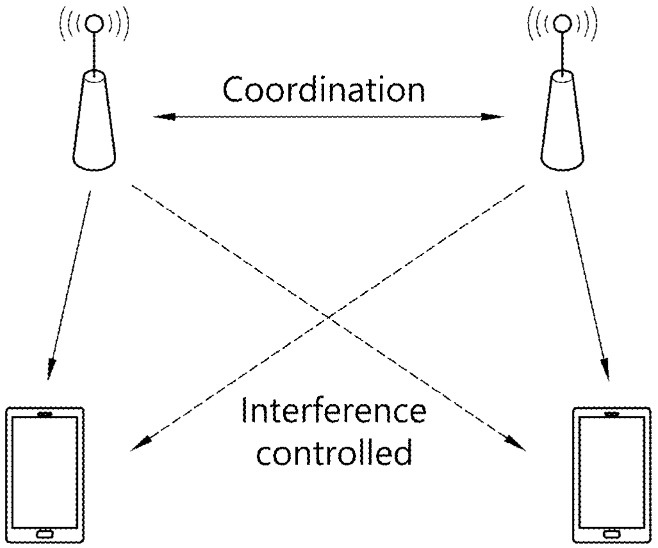
FIG. 23 shows AP coordination.

FIG. 23 shows AP coordination.

The coordinated scheduling in FIG. 23 mitigates/reduces the number of collisions of APs/STAs in different BSSs, implements a distributed mechanism, and increases the number/probability of parallel transmission in a more coordinated manner than spatial reuse. At this time, some message exchange between APs is necessary.

Figure 24:
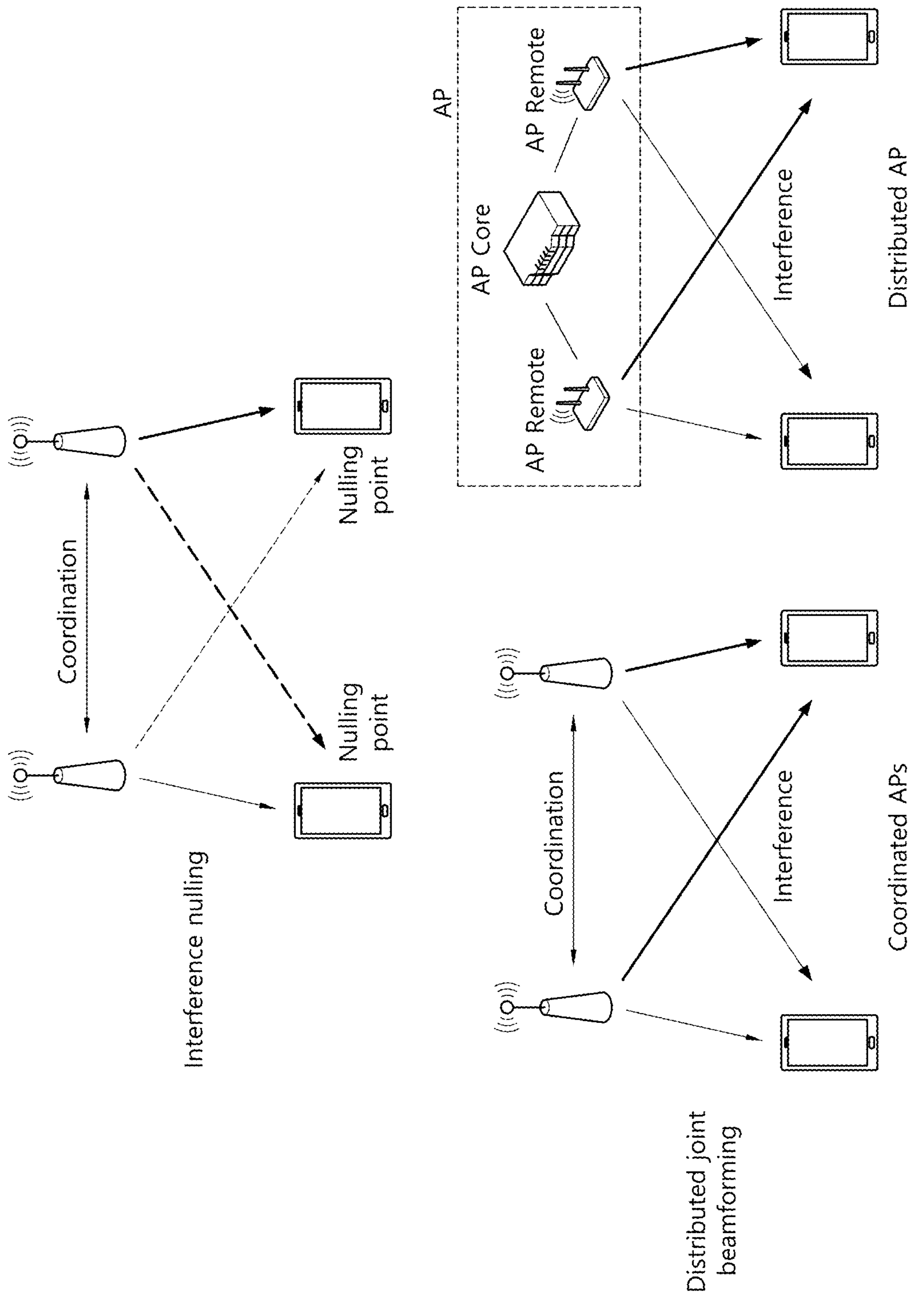
FIG. 24 shows coordinated beamforming.

FIG. 24 shows coordinated beamforming.

FIG. 24 shows simultaneous downlink link transmission without co-channel interference due to beamforming or distributed joint beamforming, such as designating the nulling point to another STA.

For example, it is suitable for administrative arrangements such as corporate offices and hotels. Benefit from regional throughput and consistent user experience within a region. Coordinated downlink scheduling, improved MU sounding to reduce overhead, and synchronization are needed.

Figure 25:
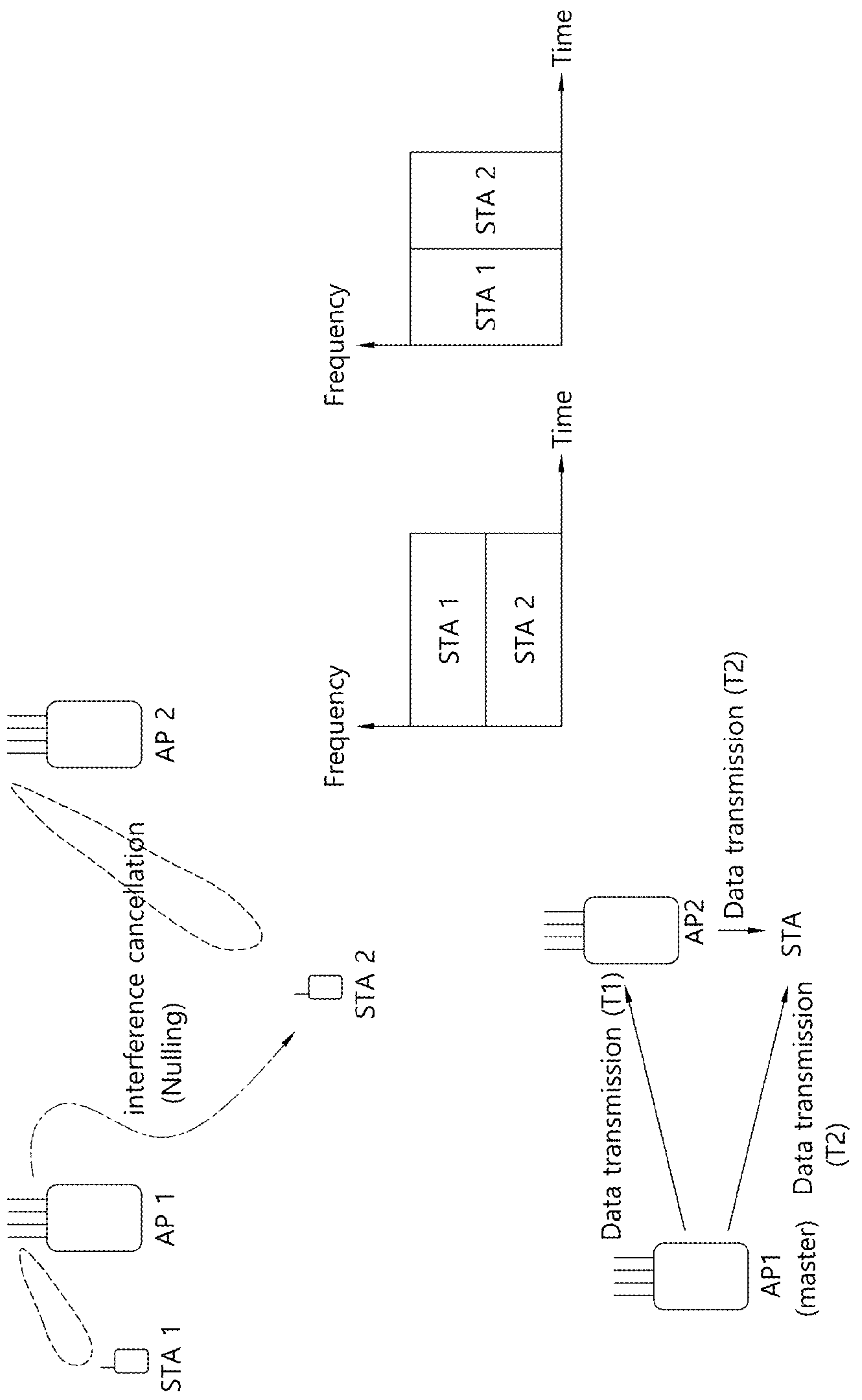
FIG. 25 shows an example of Multi-AP.

FIG. 25 shows an example of Multi-AP.

Referring to FIG. 25, Multi-AP is a technique for transmitting by coordinating multiple APs. For example, the techniques of Coordinated-Beamforming/Coordinated-OFDMA/Coordinated-TDMA/Coordinated-Spatial reuse/Joint transmission can be used.

Referring to the top of FIG. 25, AP1 can perform interference cancellation (nulling) for communication with AP2's STA2, and STA1 and STA2 can be separated by time or frequency.

Referring to the bottom of FIG. 25, AP1 (Master AP) transmits data (T1) to AP2 (Slave AP) and data (T2) to STA, and AP2 may transmit data (T2) to STA2 based on the data (T1).

5. Embodiments Applicable to this Specification

In order to improve throughput, efficiency, transmission distance, latency, etc. in the wireless LAN 802.11 system, the Distributed Antenna System (DAS), in which the antennas of the AP are distributed and located within the BSS, can be considered. This specification proposes an efficient backoff and channel access method in DAS.

Figure 26:
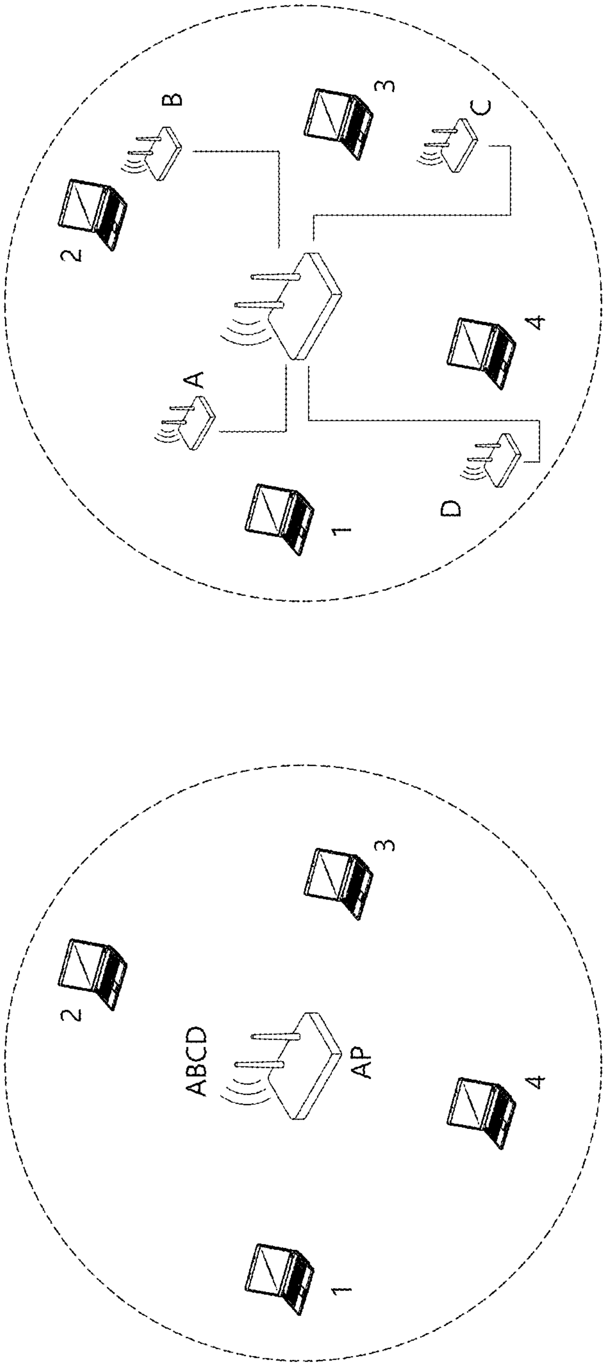
FIG. 26 is a diagram comparing CAS and DAS.

FIG. 26 is a diagram comparing CAS and DAS.

FIG. 26 is a diagram comparing the existing Co-located Antenna System (CAS), in which the AP's antenna is located in one place, and DAS, in which the antennas are distributed and located within the BSS.

The sub-drawing (a) of FIG. 26 shows CAS, and the sub-drawing (b) of FIG. 26 shows DAS.

In DAS, each antenna is connected (wired or wireless) to a central processor, and the central processor can form and process all signals when transmitting and receiving PPDUs, and each antenna can simply transmit and receive PPDUs. Additionally, each antenna can check CCA (Clear Channel Assessment) to determine whether a specific channel is busy/idle in each antenna.

Compared to existing CAS, DAS can ensure high SNR signal transmission because specific antennas and specific STAs can be located relatively close together. in particular, this environment can be provided to STAs located at the BSS edge. Additionally, since there are antennas that are relatively far away from the adjacent BSS, there is also the advantage of reducing interference to/from the adjacent BSS when using the corresponding antennas. However, since the busy/idle status of each antenna is different for each specific channel, the complexity of CCA and NAV (Network Allocation Vector) settings may increase, and additional mechanisms different from existing ones may be required. Although this is not covered in this specification, it is assumed that it is possible to determine whether a specific channel is busy or idle for each antenna.

In DAS, as before, a primary 20 MHz channel can exist within one BSS, and in this specification, it is called Primary_BSS. Additionally, an additional primary 20 MHz channel can be defined for each antenna and is named Primary_DAS. For example, in a DAS with antennas A, B, C, and D, as shown in FIG. 26 (*b*), the primary 20 MHz channels of each antenna can be defined as Primary-_DAS_A, Primary_DAS_B, Primary_DAS_C, and Primary_DAS_D. The primary 20 MHz channel of each antenna may be the same or different from each other and may also be the same or different from Primary_BSS.

Basically, DAS can also perform channel access based on EDCA (Enhanced Distributed Channel Access). That is, the backoff counter is the same as before, one value per AC (Access Category) within the BSS, and may not have different values for each antenna port. However, the difference from before is that each antenna port can have different busy/idle states in a specific channel. This specification proposes an efficient backoff and channel access method considering this situation. Basically, it determines whether a specific channel is busy/idle in all antenna ports, and if the channel is determined to be idle, backoff is performed, and channel access is possible when the backoff counter becomes 0. This specification proposes idle determination and backoff conditions, and conditions regarding antenna ports participating in channel access.

Channel access can operate based on the Primary_BSS. Also, the Primary_DAS can always exist or can be enabled only at a specific time. If the Primary_DAS always exists, each antenna port can sense the Primary_BSS and the Primary_DAS, so the burden of CCA check can increase, and the method of processing signals when transmitting and receiving PPDUs can be complicated, which may not be efficient. Therefore, in this case, each antenna port can operate only with the Primary_DAS, and there may be no Primary_BSS, or the Primary_DAS of a specific antenna port can be the Primary_BSS. Also, the Primary_DAS of the corresponding antenna port can be indicated to specific STAs adjacent to each antenna port to operate based on the corresponding primary channel. In other words, pairing between STAs and antenna ports can be considered.

When Primary_DAS is enabled only at a specific time, each antenna port can perform channel access based on the Primary_DAS, and the central processor can process a signal so that each antenna port can form or receive a PPDU based on it. As an example of enabling at a specific time, in a situation where Target Wakeup Time (TWT) is applied similar to SST, Primary_DAS can be defined for each antenna port, and the STA adjacent to each antenna port can be instructed to the corresponding Primary_DAS so that they operate based on the corresponding primary 20 MHz. That is, each STA can transmit and receive PPDUs from adjacent antenna ports based on the Primary_DAS, which can also have the effect of increasing throughput and reducing interference to/from other BSSs. In particular, overhead and complexity can be reduced from the scheduling perspective of the AP by utilizing pairing between antenna ports and STAs when transmitting and receiving PPDUs.

Below, this specification proposes an efficient backoff and channel access scheme considering the presence or absence of pairing between various primary channels and STAs and antenna ports in a Wi-Fi system with DAS applied. Since it considers the presence or absence of pairing, it basically considers unicast or multicast transmission situations (i.e., it considers the case where there is a signal to be transmitted to a specific STA or specific multiple STAs), but the scheme proposed in Section 5.1 below can be generally used in broadcast situations as well. In addition, the scheme proposed below is basically based on the existing EDCA scheme, but since DAS must consider multiple antenna ports, etc., an improved EDCA scheme can be used. Here, the improved means that the backoff conditions and channel access conditions are improved to be suitable for DAS (this is the main proposal of this specification), and other schemes can follow the existing EDCA scheme as is.

5.1. If Pairing Between STA and Antenna Port is not Defined

An improved EDCA method that performs CCA check, etc. on all antenna ports can be applied, and since pairing is not defined, channel access after CCA check and backoff can be performed on all antenna ports based on the Primary_BSS even if Primary_DAS is defined for each antenna port. Below, the backoff condition and channel access condition are specifically proposed. Below, idle on a specific antenna port means that the Primary_BSS is idle if the channel is not specified.

The condition for backoff is that if even one antenna port is idle, backoff can be performed after AIFS (Arbitration Inter Frame Space). However, the AP or STA can perform backoff only if the channel status of the corresponding antenna port is idle continuously in time. For example, if antenna ports 1 to 4 exist, antenna ports 3 and 4 are busy, but antenna ports 1 and 2 are idle, and at least one of the two remains idle continuously, the AP or STA can perform backoff after AIFS.

If none of the antenna ports in the idle state that satisfied the backoff condition is continuously idle (during backoff execution), then at the point when the antenna port that last maintained a continuous idle state changes to busy, whether to perform the backoff can be determined based on the busy/idle status of the channels of other antenna ports, excluding the last antenna port. For example, in the example above, even if antenna port 1 changes to busy in the middle, backoff will continue to be performed if antenna port 2 is continuously idle. However, if antenna port 2 changes to busy at a specific point in time, whether to perform the backoff or stop at that point can be determined based on the busy/idle statuses of antenna ports 1, 3, and 4.

At that point, if any of the other antenna ports is idle, the AP or STA can continue performing backoff. For example, in the above example, if antenna port 3 is idle at that point, the AP or STA can continue performing backoff.

If all other antenna ports are busy, the AP or STA stops performing backoff.

Or, even if certain antenna ports among other antenna ports are idle at that time, the AP or STA can continue to perform backoff only if at least one antenna port has been idle continuously since the time before the AIFS at that time. For example, in the example above, if antenna ports 3 and 4 were idle at that time and antenna port 3 had been idle continuously since the time before the AIFS, the AP or STA can continue to perform backoff.

If all other antenna ports are busy, the AP or STA stops the backoff. Even if specific antenna ports among the other antenna ports are idle, if they have not been idle since the AIFS at that point in time, the AP or STA stops the backoff. However, if at least one antenna port among the other idle antenna ports continues to be idle, the AP or STA can re-perform the backoff after an AIFS from that point in time. Alternatively, the AP or STA can re-perform the suspended backoff at the earliest point in time when the idle time of a specific antenna port among the other idle antenna ports (not idle since the AIFS at that point in all other antenna ports) becomes AIFS. For example, in the above example, antenna port 3 is idle at that point in time, and it has been idle since a time t_alpha before that point in time, but since t_alpha is less than AIFS, backoff is stopped at that point in time, but if antenna port 3 remains idle continuously, the AP or STA can re-perform backoff from that point in time AIFS-t_alpha (a time from before t_alpha to after AIFS).

As the backoff is performed as above, when the backoff counter becomes 0, the AP or STA can perform channel access by using not only the Primary_BSS but also an additional common idle channel on all antenna ports that are idle at that time without any specific conditions. Or, among the antenna ports that are idle at that time, an antenna port that is busy before the AIFS may not be able to transmit, and in this case, the AP or STA can perform channel access by using not only the Primary_BSS but also an additional common idle channel on the antenna ports that have been continuously idle before the AIFS of that time. However, the additional common idle channel other than the Primary_BSS may be selected as a common channel among the channels (channels other than the Primary_BSS) that have been continuously idle since at least the PIFS before the antenna ports participating in the transmission.

This method was proposed considering unicast/multicast, but in the case of broadcast, AP or STA can perform channel access in this way. That is, in the case of broadcast, AP or STA can perform backoff and channel access in the above-mentioned way based on Primary_BSS on all antenna ports.

The method of generating the transmitted PPDU can be the same as the existing method.

5.2. When Pairing Between STA and Antenna Port is Defined

Regardless of whether pairing between STA and antenna port is defined, AP or STA can perform channel access after CCA check and backoff on all antenna ports based on Primary_BSS as in the proposal in Section 5.1.

Or, the improved EDCA method can be applied only to pair antenna ports, that is, AP or STA can perform channel access after CCA check and backoff on pair antenna ports, which can be based on Primary_BSS or Primary_DAS as follows. The backoff condition and channel access condition are specifically proposed in each situation.

1) Primary_BSS-Based

Below, idle at a specific antenna port means that the Primary_BSS is idle if the channel is not specified. Below, pair antenna port means all antenna ports that are paired with the STAs, assuming that PPDUs are transmitted to specific STAs.

The condition for backoff is that if even one pair antenna port is idle, backoff can be performed after AIFS. However, the AP or STA can perform backoff only if the channel state of the pair antenna port is idle continuously in time. For example, suppose that there are antenna ports 1~8, and among them, the pair antenna ports are antenna ports 1~4. At this time, antenna ports 3 and 4 are busy, but antenna ports 1 and 2 are idle, and if at least one of them is continuously idle, the AP or STA can perform backoff after AIFS.

If none of the pair antenna ports in the idle state that satisfied the backoff condition is continuously idle, then at the point when the last pair antenna port that was continuously idle becomes busy, the backoff can be determined based on the busy/idle status of the other pair antenna ports, excluding the last pair antenna port. For example, in the example above, even if antenna port 1 becomes busy in the middle, backoff will continue to be performed if antenna port 2 is continuously idle. However, if antenna port 2 becomes busy at a specific point in time, whether to perform backoff at that point or stop can be determined based on the busy/idle statuses of antenna ports 1, 3, and 4.

At that time, if at least one of the pair antenna ports is idle, the AP or STA can continue performing backoff. For example, in the above example, if antenna port 3 is idle at that time, the AP or STA can continue performing backoff.

If all other pair antenna ports are busy, the AP or STA stops performing backoff.

Or, even if certain pair antenna ports among other pair antenna ports are idle at that time, the AP or STA can continue to perform backoff only if at least one pair antenna port has been idle continuously since the time before the AIFS at that time. For example, in the example above, if antenna ports 3 and 4 were idle at that time and antenna port 3 had been idle continuously since the time before the AIFS, the AP or STA can continue to perform backoff.

If all other pair antenna ports are busy, the AP or STA stops the backoff. Even if specific pair antenna ports among the other pair antenna ports are idle, if they have not been idle since the AIFS at that point, the AP or STA stops the backoff. However, if at least one pair antenna port among the other idle pair antenna ports remains idle continuously, the AP or STA can re-perform the backoff after an AIFS from that point. Alternatively, the AP or STA can re-perform the suspended backoff at the earliest point in time when the idle time of a specific pair antenna port becomes AIFS among the other idle pair antenna ports (not idle since the AIFS at that point in all other pair antenna ports).

As the backoff is performed as above, when the backoff counter becomes 0, the AP or STA can perform channel access by using not only the Primary_BSS but also an additional common idle channel in all idle pair antenna ports at that time without any specific conditions. Or, among the idle pair antenna ports at that time, a pair antenna port that is busy before the AIFS may not be able to transmit, and in this case, the AP or STA can perform channel access by using not only the Primary_BSS but also an additional common idle channel in the pair antenna ports that have been continuously idle since before the AIFS of that time. However, the additional common idle channel other than the Primary_BSS can be selected as a common channel among the channels (channels other than the Primary_BSS) that have been continuously idle since at least the PIFS before the pair antenna ports participating in the transmission. In addition, a PPDU can be transmitted only to an STA that is paired with an antenna port participating in the channel access.

The method of generating the transmitted PPDU can be the same as before.

2) Primary_DAS-Based

Below, idle at a specific antenna port means that the Primary_DAS at the corresponding antenna port is idle if the channel is not specified, and the Primary_DAS can be different for each antenna port. Below, a pair antenna port means all antenna ports that are paired with the corresponding STAs, assuming that a PPDU is transmitted to specific STAs.

The condition for backoff is that if even one of the pair antenna ports is idle, the AP or STA can perform backoff after AIFS. However, the AP or STA can perform backoff only if the channel state of the pair antenna port is idle continuously in time. For example, suppose that there are antenna ports 1 to 8 and the pair antenna ports are antenna ports 1 to 4. Antenna ports 3 and 4 are busy in their Primary_DAS, but antenna ports 1 and 2 are idle in their Primary_DAS, and if at least one of the two remains idle continuously, the AP or STA can perform backoff after AIFS.

If none of the pair antenna ports in the idle state that satisfied the backoff condition is continuously idle, then at the point when the last pair antenna port that was continuously idle becomes busy, the backoff can be determined based on the busy/idle status of the other pair antenna ports, excluding the last pair antenna port. For example, in the example above, even if antenna port 1 becomes busy in the middle, backoff will continue to be performed if antenna port 2 is continuously idle. However, if antenna port 2 becomes busy at a specific point in time, whether to perform backoff at that point or stop can be determined based on the busy/idle statuses of antenna ports 1, 3, and 4.

At that time, if at least one of the pair antenna ports is idle, the AP or STA can continue performing backoff. For example, in the above example, if antenna port 3 is idle at that time, the AP or STA can continue performing backoff.

If all other pair antenna ports are busy, the AP or STA stops performing backoff.

Or, even if certain pair antenna ports among other pair antenna ports are idle at that time, the AP or STA can continue to perform backoff only if at least one pair antenna port has been idle continuously since the time before the AIFS at that time. For example, in the example above, if antenna ports 3 and 4 were idle at that time and antenna port 3 had been idle continuously since the time before the AIFS, the AP or STA can continue to perform backoff.

If all other pair antenna ports are busy, the AP or STA stops the backoff. Even if specific pair antenna ports among the other pair antenna ports are idle, if they have not been idle since the AIFS at that point, the AP or STA stops the backoff. However, if at least one pair antenna port among the other idle pair antenna ports remains idle continuously, the AP or STA can re-perform the backoff after an AIFS from that point. Alternatively, the AP or STA can re-perform the suspended backoff at the earliest point in time when the idle time of a specific pair antenna port becomes AIFS among the other idle pair antenna ports (not idle since the AIFS at that point in all other pair antenna ports).

As the backoff is performed above, when the backoff counter becomes 0, channel access can be performed using not only the Primary_DAS within the channel allocated to it but also an additional idle channel from all idle pair antenna ports at that time without any specific conditions. Or, among the idle pair antenna ports at that time, a pair antenna port that is busy before AIFS may not be able to transmit, and in this case, the AP or STA can perform channel access using not only the Primary_DAS within the channel allocated to it but also an additional idle channel from the pair antenna ports that have been continuously idle since before AIFS of that time. However, among the pair antenna ports participating in the transmission of the additional idle channel other than the Primary_DAS, a channel (a channel other than the Primary_DAS) that has been continuously idle since at least PIFS before can be selected. In addition, a PPDU can be transmitted only to an STA that is paired with an antenna port participating in the channel access.

The method of generating the transmitted PPDU Unlike the existing method, signals can be transmitted to the pair STA only on the channel allocated from each antenna port. However, the PPDU transmitted from each antenna port can be transmitted with alignment not only of the start and the end, but also of each field, symbol boundary, and symbol number.

In the above proposals, other times may be used instead of AIFS. For example, Distributed Inter Frame Space (DIFS) or Point Coordination Function (PCF) Inter Frame Space (PIFS) may be used.

Figure 27:
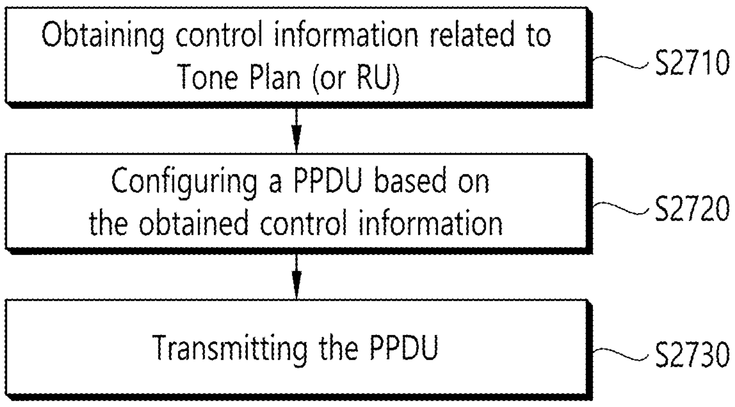
FIG. 27 is a flowchart illustrating the operation of the transmitting apparatus/device according to the present embodiment.

FIG. 27 is a flowchart illustrating the operation of the transmitting apparatus/device according to the present embodiment.

The example of FIG. 27 may be performed by a transmitting device (AP and/or non-AP STA).

Some of each step (or detailed sub-step to be described later) of the example of FIG. 27 may be skipped/omitted.

Through step S2710, the transmitting device (transmitting STA) may obtain information about the above-described tone plan. As described above, the information about the tone plan includes the size and location of the RU, control information related to the RU, information about a frequency band including the RU, information about an STA receiving the RU, and the like.

Through step S2720, the transmitting device may construct/generate a PPDU based on the acquired control information. Configuring/generating the PPDU may include configuring/generating each field of the PPDU. That is, step S2720 includes configuring the EHT-SIG field including control information about the tone plan. That is, step S2720 includes configuring a field including control information (e.g., N bitmap) indicating the size/position of the RU; and/or configuring a field including an identifier of an STA receiving the RU (e.g., AID).

Also, step S2720 may include generating an STF/LTF sequence transmitted through a specific RU. The STF/LTF sequence may be generated based on a preset STF generation sequence/LTF generation sequence.

Also, step S2720 may include generating a data field (i.e., MPDU) transmitted through a specific RU.

The transmitting device may transmit the PPDU constructed through step S2720 to the receiving device based on step S2730.

While performing step S2730, the transmitting device may perform at least one of operations such as CSD, Spatial Mapping, IDFT/IFFT operation, and GI insertion.

A signal/field/sequence constructed according to the present specification may be transmitted in the form of FIG. 10.

Figure 28:
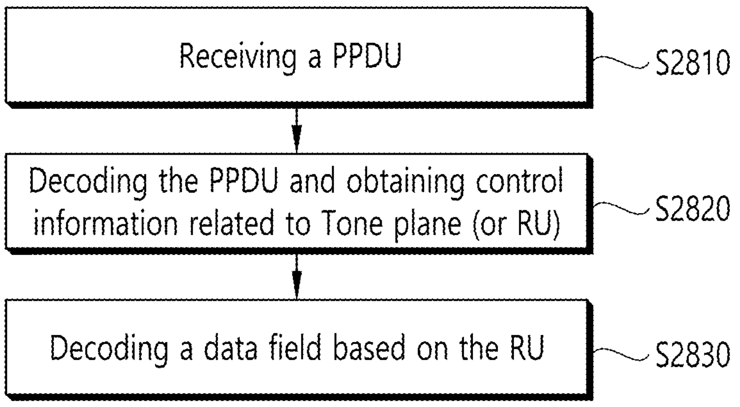
FIG. 28 is a flowchart illustrating the operation of the receiving apparatus/device according to the present embodiment.

FIG. 28 is a flowchart illustrating the operation of the receiving apparatus/device according to the present embodiment.

The aforementioned PPDU may be received according to the example of FIG. 28.

The example of FIG. 28 may be performed by a receiving apparatus/device (AP and/or non-AP STA).

Some of each step (or detailed sub-step to be described later) of the example of FIG. 28 may be skipped/omitted.

The receiving device (receiving STA) may receive all or part of the PPDU through step S2810. The received signal may be in the form of FIG. 10.

A sub-step of step S2810 may be determined based on step S2730 of FIG. 27. That is, in step S2810, an operation of restoring the result of the CSD, Spatial Mapping, IDFT/IFFT operation, and GI insertion operation applied in step S2730 may be performed.

In step S2820, the receiving device may perform decoding on all/part of the PPDU. Also, the receiving device may obtain control information related to a tone plan (i.e., RU) from the decoded PPDU.

More specifically, the receiving device may decode the L-SIG and EHT-SIG of the PPDU based on the legacy STF/LTF and obtain information included in the L-SIG and EHT SIG fields. Information on various tone plans (i.e., RUs) described in this specification may be included in the EHT-SIG, and the receiving STA may obtain information on the tone plan (i.e., RU) through the EHT-SIG.

In step S2830, the receiving device may decode the remaining part of the PPDU based on information about the tone plan (i.e., RU) acquired through step S2820. For example, the receiving STA may decode the STF/LTF field of the PPDU based on information about one plan (i.e., RU). In addition, the receiving STA may decode the data field of the PPDU based on information about the tone plan (i.e., RU) and obtain the MPDU included in the data field.

In addition, the receiving device may perform a processing operation of transferring the data decoded through step S2830 to a higher layer (e.g., MAC layer). In addition, when generation of a signal is instructed from the upper layer to the PHY layer in response to data transmitted to the upper layer, a subsequent operation may be performed.

Hereinafter, the above-described embodiment will be described with reference to FIG. 1 to FIG. 28.

Figure 29:
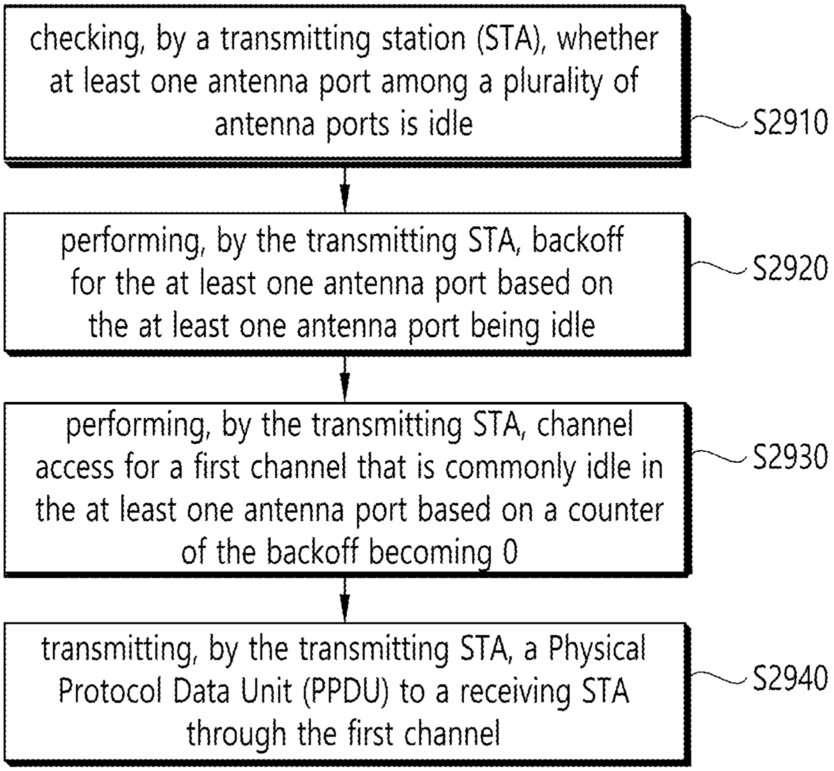
FIG. 29 is a flow diagram illustrating a procedure in which a transmitting STA performs backoff and channel access for distributed antenna ports in the DAS according to this embodiment.

FIG. 29 is a flow diagram illustrating a procedure in which a transmitting STA performs backoff and channel access for distributed antenna ports in the DAS according to this embodiment.

The example of FIG. 29 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 29 is performed at a transmitting STA, and the transmitting STA may correspond to an access point (AP) or a station (STA). Conversely, the receiving STA in FIG. 29 may correspond to an STA or an AP. When the transmitting STA is an AP and the receiving STA is an STA, a PPDU described later may be a downlink PPDU. When the transmitting STA is an STA and the receiving STA is an AP, a PPDU described later may be an uplink PPDU.

This embodiment proposes a method of transmitting and receiving PPDUs by performing backoff and channel access for antenna ports distributed in a DAS.

In step S2910, a transmitting station (STA) checks whether at least one antenna port among a plurality of antenna ports is idle.

In step S2920, the transmitting STA performs backoff for the at least one antenna port based on the at least one antenna port being idle.

In step S2930, the transmitting STA performs channel access for a first channel that is commonly idle in the at least one antenna port based on a counter of the backoff becoming 0.

In step S2940, the transmitting STA transmits a Physical Protocol Data Unit (PPDU) to a receiving STA through the first channel.

The transmitting STA operates in a system in which a plurality of antenna ports are distributed.

A first primary 20 MHz channel is set for the plurality of antenna ports. Additionally, a second primary 20 MHz channel may be further set for the plurality of antenna ports.

The first primary 20 MHz channel is a primary 20 MHz channel that exists within one Basic Service Set (BSS). The one BSS may be a BSS of the transmitting STA. The second primary 20 MHz channel is an additional primary 20 MHz channel for each of the plurality of antenna ports. The plurality of antenna ports may include first to fourth antenna ports.

Whether the at least one antenna port is idle is determined by/based on whether the first primary 20 MHz channel of the at least one antenna port is idle. In particular, the backoff may be performed after Arbitration Inter Frame Space (AIFS) when the first primary 20 MHz channel of the at least one antenna port is continuously confirmed to be idle.

For example, if the third and fourth antenna ports are busy, but the first and second antenna ports are idle and at least one of the two antenna ports is continuously maintained in an idle state, the transmitting STA may perform the backoff after AIFS.

That is, the present embodiment proposes a method for performing backoff and channel access on all antenna ports based on the first primary 20 MHz channel (Primary_BSS) of the distributed antenna ports. Since it is assumed that the receiving STA does not establish pairing for each of the plurality of antennas, the busy/idle status of the second primary 20 MHz channel (Primary_DAS) of the distributed antenna port may not be considered. If the receiving STA establishes pairing for each of the plurality of antennas, the backoff and channel access may be performed on all antenna ports based on the first or second primary 20 MHz channel of the distributed antenna port, as described above in various embodiments.

If/Based on the first primary 20 MHz channel of the at least one antenna port changes/changing to busy before the counter of the backoff becomes 0, the following operation may be performed.

The transmitting STA may check whether other antenna ports except for the at least one port are idle at a time when a state of the first primary 20 MHz channel of the at least one antenna port changes.

The transmitting STA may continue to perform the backoff based on the other antenna ports being idle. The transmitting STA may stop the backoff based on all the other antenna ports being busy.

Similarly, whether the other antenna port is idle may be determined by/based on whether the first primary 20 MHz channel of the other antenna port is idle.

For example, if the second antenna port is changed to busy at a certain point in time, whether the transmitting STA continues to perform the backoff or stops at that point in time may be determined based on whether the first, third, and fourth antenna ports are busy/idle. If any one of the first, third, and fourth antenna ports is idle, the transmitting STA may continue to perform the backoff. In contrast, if all of the first, third, and fourth antenna ports are busy, the transmitting STA may stop the backoff.

The first channel may be a common idle channel among the first primary 20 MHz channel of the at least one antenna port and channels that are continuously idle from at least Point Coordination Function (PCF) Inter Frame Space (PIFS) before the at least one antenna port.

For example, it may be assumed that the bandwidth of the PPDU includes the first to fourth 20 MHz channels, and for the first antenna port, the first primary 20 MHz channel is the first 20 MHz channel. If the first antenna port is idle, the first 20 MHz channel (the first primary 20 MHz channel) will also be idle. If the second and fourth 20 MHz channels for the first antenna port are also idle continuously from before the PIFS, the first channel may include the first, second and fourth 20 MHz channels.

When/Based on the plurality of antenna ports include/including first to fourth antenna ports, the second primary 20 MHz channel may include first to fourth Distributed Antenna System (DAS) primary channels.

The first DAS primary channel may be an additional primary 20 MHz channel of the first antenna port. The second DAS primary channel may be an additional primary 20 MHz channel of the second antenna port. The third DAS primary channel may be an additional primary 20 MHz channel of the third antenna port. The fourth DAS primary channel may be an additional primary 20 MHz channel of the fourth antenna port.

Previously, there was no definition of the DAS transmission technique, so there was a limit to improving performance such as throughput and latency by extending the transmission distance. However, according to the embodiment proposed in this specification, by further defining an additional primary 20 MHz channel for each antenna port in addition to the existing primary 20 MHz channel in one BSS, DAS can be efficiently supported, and backoff and channel access for distributed antenna ports can be effectively performed. This has the effect of improving throughput and latency performance by extending the transmission distance.

The above second primary 20 MHz channel can be indicated by an Operation element related to Subchannel Selective Transmission (SST) and can be set only while a Target Wakeup Time (TWT) is applied. When pairing is set between a specific receiving STA and a plurality of antenna ports, the specific receiving STA may perform backoff and channel access by using the second primary 20 MHz as a primary 20 MHz channel for a specific antenna port. When an adjacent receiving STA is paired for a specific antenna port, there is an advantage that the transmitting STA can send a signal to the receiving STA at a closer distance through the DAS. The plurality of antenna ports are wired to the transmitting STA.

Figure 30:
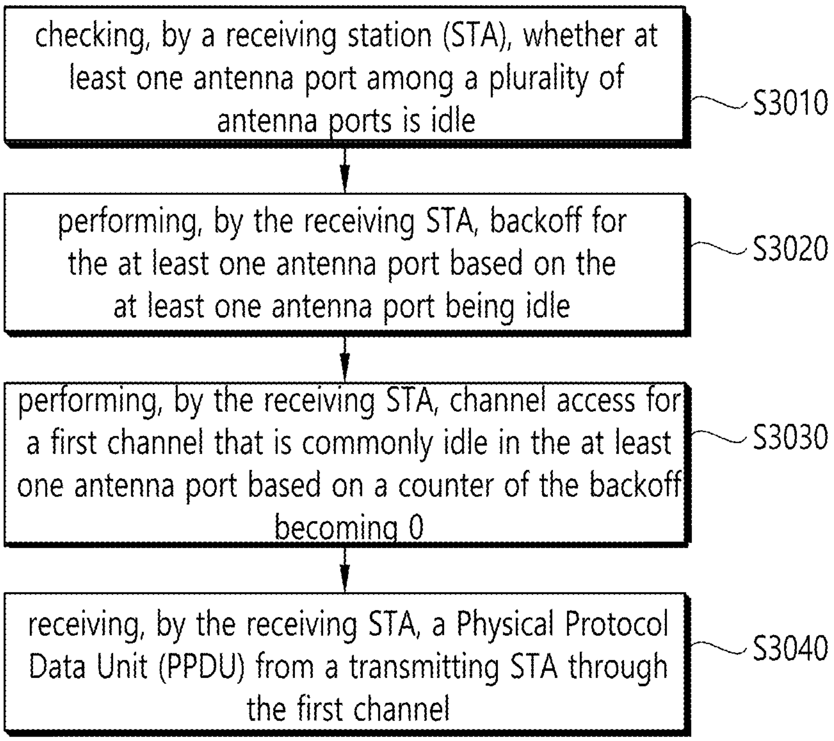
FIG. 30 is a flow diagram illustrating a procedure in which a receiving STA performs backoff and channel access for distributed antenna ports in the DAS according to this embodiment.

FIG. 30 is a flow diagram illustrating a procedure in which a receiving STA performs backoff and channel access for distributed antenna ports in the DAS according to this embodiment.

The example of FIG. 30 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 30 is performed at a receiving STA, and the receiving STA may correspond to a station (STA) or an access point (AP). Conversely, the transmitting STA in FIG. 30 may correspond to an AP or STA. When the transmitting STA is an AP and the receiving STA is an STA, a PPDU described later may be a downlink PPDU. When the transmitting STA is an STA and the receiving STA is an AP, a PPDU described later may be an uplink PPDU.

This embodiment proposes a method of transmitting and receiving PPDUs by performing backoff and channel access for antenna ports distributed in a DAS.

In step S3010, a receiving station (STA) checks whether at least one antenna port among a plurality of antenna ports is idle.

In step S3020, the receiving STA performs backoff for the at least one antenna port based on the at least one antenna port being idle.

In step S3030, the receiving STA performs channel access for a first channel that is commonly idle in the at least one antenna port based on a counter of the backoff becoming 0.

In step S3040, the receiving STA receives a Physical Protocol Data Unit (PPDU) from a transmitting STA through the first channel.

The transmitting STA operates in a system in which a plurality of antenna ports are distributed.

A first primary 20 MHz channel is set for the plurality of antenna ports. Additionally, a second primary 20 MHz channel may be further set for the plurality of antenna ports.

The first primary 20 MHz channel is a primary 20 MHz channel that exists within one Basic Service Set (BSS). The one BSS may be a BSS of the transmitting STA. The second primary 20 MHz channel is an additional primary 20 MHz channel for each of the plurality of antenna ports. The plurality of antenna ports may include first to fourth antenna ports.

Whether the at least one antenna port is idle is determined by/based on whether the first primary 20 MHz channel of the at least one antenna port is idle. In particular, the backoff may be performed after Arbitration Inter Frame Space (AIFS) when the first primary 20 MHz channel of the at least one antenna port is continuously confirmed to be idle.

For example, if the third and fourth antenna ports are busy, but the first and second antenna ports are idle and at least one of the two antenna ports is continuously maintained in an idle state, the transmitting STA may perform the backoff after AIFS.

That is, the present embodiment proposes a method for performing backoff and channel access on all antenna ports based on the first primary 20 MHz channel (Primary_BSS) of the distributed antenna ports. Since it is assumed that the receiving STA does not establish pairing for each of the plurality of antennas, the busy/idle status of the second primary 20 MHz channel (Primary_DAS) of the distributed antenna port may not be considered. If the receiving STA establishes pairing for each of the plurality of antennas, the backoff and channel access may be performed on all antenna ports based on the first or second primary 20 MHz channel of the distributed antenna port, as described above in various embodiments.

If/Based on the first primary 20 MHz channel of the at least one antenna port changes/changing to busy before the counter of the backoff becomes 0, the following operation may be performed.

The receiving STA may check whether other antenna ports except for the at least one port are idle at a time when a state of the first primary 20 MHz channel of the at least one antenna port changes.

The receiving STA may continue to perform the backoff based on the other antenna ports being idle. The receiving STA may stop the backoff based on all the other antenna ports being busy.

Similarly, whether the other antenna port is idle may be determined by/based on whether the first primary 20 MHz channel of the other antenna port is idle.

For example, if the second antenna port is changed to busy at a certain point in time, whether the transmitting STA continues to perform the backoff or stops at that point in time may be determined based on whether the first, third, and fourth antenna ports are busy/idle. If any one of the first, third, and fourth antenna ports is idle, the transmitting STA may continue to perform the backoff. In contrast, if all of the first, third, and fourth antenna ports are busy, the transmitting STA may stop the backoff.

The first channel may be a common idle channel among the first primary 20 MHz channel of the at least one antenna port and channels that are continuously idle from at least Point Coordination Function (PCF) Inter Frame Space (PIFS) before the at least one antenna port.

For example, it may be assumed that the bandwidth of the PPDU includes the first to fourth 20 MHz channels, and for the first antenna port, the first primary 20 MHz channel is the first 20 MHz channel. If the first antenna port is idle, the first 20 MHz channel (the first primary 20 MHz channel) will also be idle. If the second and fourth 20 MHz channels for the first antenna port are also idle continuously from before the PIFS, the first channel may include the first, second and fourth 20 MHz channels.

When/Based on the plurality of antenna ports include/including first to fourth antenna ports, the second primary 20 MHz channel may include first to fourth Distributed Antenna System (DAS) primary channels.

The first DAS primary channel may be an additional primary 20 MHz channel of the first antenna port. The second DAS primary channel may be an additional primary 20 MHz channel of the second antenna port. The third DAS primary channel may be an additional primary 20 MHz channel of the third antenna port. The fourth DAS primary channel may be an additional primary 20 MHz channel of the fourth antenna port.

Previously, there was no definition of the DAS transmission technique, so there was a limit to improving performance such as throughput and latency by extending the transmission distance. However, according to the embodiment proposed in this specification, by further defining an additional primary 20 MHz channel for each antenna port in addition to the existing primary 20 MHz channel in one BSS, DAS can be efficiently supported, and backoff and channel access for distributed antenna ports can be effectively performed. This has the effect of improving throughput and latency performance by extending the transmission distance.

The above second primary 20 MHz channel can be indicated by an Operation element related to Subchannel Selective Transmission (SST) and can be set only while a Target Wakeup Time (TWT) is applied. When pairing is set between a specific receiving STA and a plurality of antenna ports, the specific receiving STA may perform backoff and channel access by using the second primary 20 MHz as a primary 20 MHz channel for a specific antenna port. When an adjacent receiving STA is paired for a specific antenna port, there is an advantage that the transmitting STA can send a signal to the receiving STA at a closer distance through the DAS. The plurality of antenna ports are wired to the transmitting STA.

6. Device Configuration

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure checks whether at least one antenna port among a plurality of antenna ports is idle; performs backoff for the at least one antenna port based on the at least one antenna port being idle; performs channel access for a first channel that is commonly idle in the at least one antenna port based on a counter of the backoff becoming 0; and receives a Physical Protocol Data Unit (PPDU) from a transmitting station (STA) through the first channel.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including checking whether at least one antenna port among a plurality of antenna ports is idle; performing backoff for the at least one antenna port based on the at least one antenna port being idle; performing channel access for a first channel that is commonly idle in the at least one antenna port based on a counter of the backoff becoming 0; and receiving a Physical Protocol Data Unit (PPDU) from a transmitting station (STA) through the first channel. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

checking, by a receiving station (STA), whether at least one antenna port among a plurality of antenna ports is idle;

performing, by the receiving STA, backoff for the at least one antenna port based on the at least one antenna port being idle;

performing, by the receiving STA, channel access for a first channel that is commonly idle in the at least one antenna port based on a counter of the backoff becoming 0; and receiving, by the receiving STA, a Physical Protocol Data Unit (PPDU) from a transmitting STA through the first channel, wherein the transmitting STA operates in a system in which the plurality of antenna ports are distributed, wherein a first primary 20 MHz channel is set for the plurality of antenna ports, wherein the first primary 20 MHz channel is a primary 20 MHz channel that exists within one Basic Service Set (BSS), and wherein whether the at least one antenna port is idle is determined based on whether the first primary 20 MHz channel of the at least one antenna port is idle.

2. The method of claim 1, wherein the backoff is performed after the first primary 20 MHz channel of the at least one antenna port is confirmed to be idle continuously and after Arbitration Inter Frame Space (AIFS).

3. The method of claim 1, wherein based on the first primary 20 MHz channel of the at least one antenna port changing to busy before the counter of the backoff becomes 0, further comprising:

checking, by the receiving STA, whether other antenna ports except the at least one port are idle at the time when a state of the first primary 20 MHz channel of the at least one antenna port changes;

continuing, by the receiving STA, to perform the backoff based on the other antenna ports being idle; and stopping, by the receiving STA, the backoff based on all the other antenna ports being busy, wherein whether the other antenna ports are idle is determined based on whether the first primary 20 MHz channel of the other antenna ports is idle.

4. The method of claim 1, wherein the first channel is a common idle channel among the first primary 20 MHz channel of the at least one antenna port and channels that are continuously idle from at least Point Coordination Function (PCF) Inter Frame Space (PIFS) before the at least one antenna port.

5. The method of claim 1, wherein a second primary 20 MHz channel is further set for the plurality of antenna ports, wherein the second primary 20 MHz channel is an additional primary 20 MHz channel for each of the plurality of antenna ports.

6. The method of claim 5, wherein based on the plurality of antenna ports including first to fourth antenna ports, the second primary 20 MHz channel includes first to fourth Distributed Antenna System (DAS) primary channels, wherein the first DAS primary channel is an additional primary 20 MHz channel of the first antenna port, wherein the second DAS primary channel is an additional primary 20 MHz channel of the second antenna port, wherein the third DAS primary channel is an additional primary 20 MHz channel of the third antenna port, wherein the fourth DAS primary channel is an additional primary 20 MHz channel of the fourth antenna port.

7. The method of claim 1, wherein the one BSS is a BSS of the transmitting STA, wherein the receiving STA does not establish pairing for each of the plurality of antennas.

8. A receiving station (STA) in a wireless local area network (WLAN) system, the receiving STA comprising:

a memory;

a transceiver; and a processor being operatively connected to the memory and the transceiver, wherein the processor is configured to:

check whether at least one antenna port among a plurality of antenna ports is idle;

perform backoff for the at least one antenna port based on the at least one antenna port being idle;

perform channel access for a first channel that is commonly idle in the at least one antenna port based on a counter of the backoff becoming 0; and receive a Physical Protocol Data Unit (PPDU) from a transmitting STA through the first channel, wherein the transmitting STA operates in a system in which the plurality of antenna ports are distributed, wherein a first primary 20 MHz channel is set for the plurality of antenna ports, wherein the first primary 20 MHz channel is a primary 20 MHz channel that exists within one Basic Service Set (BSS), and wherein whether the at least one antenna port is idle is determined based on whether the first primary 20 MHz channel of the at least one antenna port is idle.

9. A method in a wireless local area network (WLAN) system, the method comprising:

checking, by a transmitting station (STA), whether at least one antenna port among a plurality of antenna ports is idle;

performing, by the transmitting STA, backoff for the at least one antenna port based on the at least one antenna port being idle;

performing, by the transmitting STA, channel access for a first channel that is commonly idle in the at least one antenna port based on a counter of the backoff becoming 0; and transmitting, by the transmitting STA, a Physical Protocol Data Unit (PPDU) to a receiving STA through the first channel, wherein the transmitting STA operates in a system in which the plurality of antenna ports are distributed, wherein a first primary 20 MHz channel is set for the plurality of antenna ports, wherein the first primary 20 MHz channel is a primary 20 MHz channel that exists within one Basic Service Set (BSS), and wherein whether the at least one antenna port is idle is determined based on whether the first primary 20 MHz channel of the at least one antenna port is idle.

10. The method of claim 9, wherein the backoff is performed after the first primary 20 MHz channel of the at least one antenna port is confirmed to be idle continuously and after Arbitration Inter Frame Space (AIFS).

11. The method of claim 9, wherein based on the first primary 20 MHz channel of the at least one antenna port changing to busy before the counter of the backoff becomes 0, further comprising:

checking, by the transmitting STA, whether other antenna ports except the at least one port are idle at the time when a state of the first primary 20 MHz channel of the at least one antenna port changes;

continuing, by the transmitting STA, to perform the backoff based on the other antenna ports being idle; and stopping, by the transmitting STA, the backoff based on all the other antenna ports being busy, wherein whether the other antenna ports are idle is determined based on whether the first primary 20 MHz channel of the other antenna ports is idle.

12. The method of claim 9, wherein the first channel is a common idle channel among the first primary 20 MHz channel of the at least one antenna port and channels that are continuously idle from at least Point Coordination Function (PCF) Inter Frame Space (PIFS) before the at least one antenna port.

13. The method of claim 9, wherein a second primary 20 MHz channel is further set for the plurality of antenna ports, wherein the second primary 20 MHz channel is an additional primary 20 MHz channel for each of the plurality of antenna ports.

14. The method of claim 13, wherein based on the plurality of antenna ports including first to fourth antenna ports, the second primary 20 MHz channel includes first to fourth Distributed Antenna System (DAS) primary channels, wherein the first DAS primary channel is an additional primary 20 MHz channel of the first antenna port, wherein the second DAS primary channel is an additional primary 20 MHz channel of the second antenna port, wherein the third DAS primary channel is an additional primary 20 MHz channel of the third antenna port, wherein the fourth DAS primary channel is an additional primary 20 MHz channel of the fourth antenna port.

15. The method of claim 9, wherein the one BSS is a BSS of the transmitting STA, wherein the receiving STA does not establish pairing for each of the plurality of antennas.

* * * * *